(12) United States Patent
Meylan

(10) Patent No.: US 8,830,950 B2
(45) Date of Patent: Sep. 9, 2014

(54) METHOD AND APPARATUS FOR PDCP REORDERING AT HANDOFF

(75) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1253 days.

(21) Appl. No.: 12/140,847

(22) Filed: Jun. 17, 2008

(65) Prior Publication Data

US 2008/0310367 A1 Dec. 18, 2008

Related U.S. Application Data

(60) Provisional application No. 60/944,775, filed on Jun. 18, 2007, provisional application No. 61/038,036, filed on Mar. 19, 2008.

(51) Int. Cl.
| | |
|---|---|
| *H04L 12/28* | (2006.01) |
| *H04W 36/02* | (2009.01) |
| *H04W 36/00* | (2009.01) |
| *H04W 36/08* | (2009.01) |

(52) U.S. Cl.
CPC .............. *H04W 36/02* (2013.01); *H04W 36/08* (2013.01)
USPC ............................ 370/331; 370/252; 370/394

(58) Field of Classification Search
CPC .................................................. H04W 76/025
USPC ........................................ 370/252, 331, 394
See application file for complete search history.

(56) References Cited

U.S. PATENT DOCUMENTS

| | | | |
|---|---|---|---|
| 5,896,373 A | 4/1999 | Mitts et al. | |
| 6,055,427 A | 4/2000 | Ojaniemi | |
| 6,463,285 B1 | 10/2002 | Davies et al. | |
| 6,909,899 B2 | 6/2005 | Wang et al. | |
| 7,107,057 B2 | 9/2006 | Arazi et al. | |
| 7,542,448 B2 * | 6/2009 | Qi et al. | 370/331 |
| 8,571,556 B2 * | 10/2013 | Lee et al. | 455/436 |
| 2001/0053144 A1 * | 12/2001 | Leroy et al. | 370/349 |
| 2002/0018472 A1 * | 2/2002 | Rinne et al. | 370/394 |

(Continued)

FOREIGN PATENT DOCUMENTS

| | | |
|---|---|---|
| CN | 1596023 A | 3/2005 |
| CN | 1596203 A | 3/2005 |

(Continued)

OTHER PUBLICATIONS

"User Plane Data Handling at Handover", 3GPP TSG-RAN WG2 Meeting #58, R2-071719, Kobe, Japan, May 7-11, 2007.

(Continued)

*Primary Examiner* — John Pezzlo
(74) *Attorney, Agent, or Firm* — Nerrie M. Zohn

(57) ABSTRACT

Systems and methodologies are described that facilitate management of data delivery and processing in a wireless communication system and, more particularly, that support Packet Data Convergence Protocol (PDCP) reordering of packets during a handoff operation. Various aspects described herein can mitigate processing delays associated with PDCP reordering of packets at handoff by determining, communicating, and/or otherwise identifying one or more indicators during handoff that facilitate lossless communication of packets to a terminal with minimal delay. These indicators can include sequence number information for a source Node B, information regarding a step or jump size applied to a sequence number by a target Node B, a reset command, and/or other suitable indicators.

82 Claims, 17 Drawing Sheets

(56) References Cited

U.S. PATENT DOCUMENTS

| | | | |
|---|---|---|---|
| 2003/0007490 A1* | 1/2003 | Yi et al. | 370/394 |
| 2003/0008653 A1 | 1/2003 | Jiang | |
| 2003/0022654 A1 | 1/2003 | Kakani et al. | |
| 2003/0224786 A1 | 12/2003 | Lee et al. | |
| 2004/0005893 A1 | 1/2004 | Isobe et al. | |
| 2004/0131040 A1 | 7/2004 | Gruhl et al. | |
| 2004/0190609 A1 | 9/2004 | Watanabe | |
| 2004/0246917 A1 | 12/2004 | Cheng et al. | |
| 2005/0141477 A1 | 6/2005 | Tomita et al. | |
| 2005/0201337 A1 | 9/2005 | Heo et al. | |
| 2005/0259663 A1 | 11/2005 | Ode et al. | |
| 2006/0274694 A1* | 12/2006 | Rajkumar et al. | 370/331 |
| 2007/0047547 A1* | 3/2007 | Conner et al. | 370/392 |
| 2007/0177547 A1 | 8/2007 | Horn et al. | |
| 2007/0248049 A1* | 10/2007 | Fajardo et al. | 370/331 |
| 2007/0265875 A1* | 11/2007 | Jiang et al. | 705/1 |
| 2008/0019320 A1* | 1/2008 | Phan et al. | 370/331 |
| 2008/0123673 A1* | 5/2008 | Lee | 370/412 |
| 2008/0130580 A1* | 6/2008 | Chaponniere et al. | 370/331 |
| 2010/0098024 A1 | 4/2010 | Nagatake | |
| 2010/0238903 A1* | 9/2010 | Kitazoe | 370/332 |
| 2010/0293372 A1* | 11/2010 | Fischer et al. | 713/168 |

FOREIGN PATENT DOCUMENTS

| | | |
|---|---|---|
| EP | 0777396 A1 | 6/1997 |
| EP | 1059823 A1 | 12/2000 |
| EP | 1276279 A1 | 1/2003 |
| EP | 1320274 A2 | 6/2003 |
| EP | 1383292 A1 | 1/2004 |
| EP | 1460866 A2 | 9/2004 |
| JP | 8168071 A | 6/1996 |
| JP | 9186704 A | 7/1997 |
| JP | 2003102055 A | 4/2003 |
| JP | 2004282652 A | 10/2004 |
| JP | 2005525757 A | 8/2005 |
| JP | 2006245824 A | 9/2006 |
| JP | 2007150538 A | 6/2007 |
| RU | 2205515 C2 | 5/2003 |
| TW | 200401543 | 1/2004 |
| WO | 9804094 A1 | 1/1998 |
| WO | WO9847302 | 10/1998 |
| WO | WO9917488 A1 | 4/1999 |
| WO | 03013044 A2 | 2/2003 |
| WO | 03096712 A1 | 11/2003 |
| WO | 2004030396 A1 | 4/2004 |
| WO | WO2004077719 | 9/2004 |
| WO | WO2006130354 | 12/2006 |

OTHER PUBLICATIONS

"User Plane Data Handling during HO", 3GPP TSG-RAN2 Meeting #58 Tdoc, R2-071704, Kobe, Japan, May 7-11, 2007.

ETSI: Universal mobile telecommunications system (UMTS); Packet data convergence protocol (PDCP) specification, ETSI TS 125 323 v3.3.0, Sep. 2000, Advances in the Production and Use of Steel With Improvedinternal Cleanliness, Jan. 1, 1999.

International Search Report/Written Opinion—PCT/US08/067385—International Search Authority EPO—Dec. 5, 2008.

Lee, et al.: "Out-of-sequence packet analysis in mobile IP handoff and its enhancement," XP002225432; Retrieved from the Internet: URL:http://netmedia.kjist.ac.kr/jongwon/papers/20023gwireless-mobileip.pdf> [retrieved on Dec. 16, 2002], the whole document.

V. Dorot and others Explanatory dictionary of modern computer vocabulary (second edition), BHV-Petersburg, Saint-Petersburg, 2001,—D2—p. 339.

Madan B.B., et al., "Combined Guard Channel and Mobile Assisted Handoff for Cellular Networks" IEEE transactions on vehicular technology, vol.: 57, Issue: 1, Jan. 2008, pp. 1-9.

Qualcomm Europe: "Qualcomm proposal for E-UTRAN Architecture and Protocols" 3GPP Draft; R2-052921, SRD Generation Partnership Project (3GPP), Mobile Competence Centre; 650, Route Des Lucioles; F-06921 Sophia-Antipolis Cedex; France, vol. 1, no. Seoul,Korea;20051107, Nov. 1, 2005, XP050130142.

Taiwan Search Report—TW097122779—TIPO—Jun. 14, 2012.

Zeng Q.A et al., "Handoff in Wireless Mobile Networks" Chapter 1, Dec. 5, 2001, pp. 1-26.

Base Tranceiver Station—From Wikipedia, the free encyclopedia.

Dingley et al., Wikipedia: "Base transceiver station" —From Wikipedia, the free encyclopedia, Aug. 19, 2013, pp. 3, URL: http://en.wikipedia.org/wiki/Base_transceiver_station.

* cited by examiner

METHOD AND APPARATUS FOR PDCP REORDERING AT HANDOFF

CROSS-REFERENCE

This application claims the benefit of U.S. Provisional Application Ser. No. 60/944,775, filed Jun. 18, 2007, and entitled "METHOD AND APPARATUS TO SUPPORT PDCP REORDERING AT HANDOFF," and U.S. Provisional Application Ser. No. 61/038,036, filed Mar. 19, 2008, and entitled "METHOD AND APPARATUS TO SUPPORT PDCP BEHAVIOUR AT HANDOFF," the entirety of which are incorporated herein by reference.

BACKGROUND

I. Field

The present disclosure relates generally to wireless communications, and more specifically to techniques for managing handoff operations in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Data provided for communication in a wireless communication system can be encapsulated into packets and communicated between a Node B and a user equipment (UE) based on Packet Data Convergence Protocol (PDCP) and/or another suitable protocol. Further, if a UE moves outside of the serving area of a Node B or otherwise requests communication service from a Node B other than a Node B currently serving the UE, a handoff procedure can be initiated to transition communication service for the UE from a current Node B to a new Node B. At handoff, any packets held by the original Node B can be forwarded to the new Node B for transmission to the UE. Some communication protocols, such as PDCP, require in-sequence delivery of packets, such that a sequence of packets is maintained between packets transmitted from the original Node B and those transmitted by the new Node B. However, no techniques presently exist to ensure that in-sequence delivery of packets is maintained through a handoff without incurring significant processing delays. Accordingly, there exists a need for techniques that facilitate efficient management of packet forwarding during handoff.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for managing communication in a wireless communication system is described herein. The method can comprise identifying one or more forwarded packets associated with a handoff procedure; identifying one or more indicators that facilitate lossless communication of packets with mitigated delay subsequent to the forwarded packets; and communicating respective packets subsequent to the forwarded packets based on the identified indicators to facilitate lossless reception of the packets with mitigated delay.

Another aspect relates to a wireless communications apparatus that can comprise a memory that stores data relating to at least one data unit to be transmitted upon a handover of communication service to the wireless communications apparatus and at least one indicator that facilitates lossless delivery of the at least one data unit through the handover of communication service without unaccounted sequence gaps in the at least one data unit. The wireless communications apparatus can further comprise a processor configured to deliver the at least one data unit based on the at least one indicator.

Yet another aspect relates to an apparatus that facilitates continuous sequencing of packets for transmission through a handoff. The apparatus can comprise means for receiving one or more selectively forwarded packets for communication in connection with a handoff; means for identifying state information and order information associated with the packets that facilitate lossless delivery of the packets; and means for transmitting respective packets subsequent to the selectively forwarded packets using the state information in an order specified by the order information.

Still another aspect relates to a computer program product, which can comprise a computer-readable medium that comprises code for identifying one or more Packet Data Convergence Protocol (PDCP) packets to be communicated; code for identifying information relating to the one or more PDCP packets, the information comprising at least one of a last known sequence number used for communication, a next available sequence number for communication, a sequence step size to be applied to the one or more PDCP packets, or a reset command; code for setting respective sequence numbers of one or more PDCP packets received subsequent to the identified PDCP packets based at least in part on the identified information to facilitate continuity of sequence between one or more PDCP packets previously communicated and the one or more subsequently received PDCP packets; and code for relaying the one or more subsequently received PDCP packets using the respectively set sequence numbers.

An additional aspect relates to an integrated circuit that executes computer-executable instructions for coordinating data delivery through a handover operation. The instructions can comprise receiving at least one selectively forwarded Service Data Unit (SDU); identifying at least one of sequence number information or a reset command; receiving at least one subsequent SDU; and associating respective sequence numbers with respective subsequent SDUs to facilitate lossless delivery of the subsequent SDUs and to maintain continuity between one or more SDUs previously communicated and the subsequent SDUs based on at least one of identified sequence number information or an identified reset command.

According to another aspect, a method for processing packets received during a handoff operation is described herein. The method can comprise receiving at least one packet from a first Node B; identifying information associated with a handoff from the first Node B to a second Node B; and receiving at least one packet from the second Node B in a continuous manner from the at least one packet received from the first Node B based on the identified information.

A further aspect relates to a wireless communications apparatus that can comprise a memory that stores data relating to respective data units received from a first base station, respective sequence numbers associated with the data units received from the first base station, and information relating to a handover from the first base station to a second base station. The wireless communications apparatus can further comprise a processor configured to receive at least one data unit from the second base station based on the information relating to the handover without requiring a delay for attempting to detect additional data units.

Another aspect relates to an apparatus that facilitates substantially uninterrupted data communication and processing during a communication handover. The apparatus can comprise means for receiving one or more data units from a first source; means for identifying information relating to a change in service from the first source to a second source; means for receiving one or more data units from the second source based on the identified information; and means for processing data units received from the second source without delay associated with attempting to detect additional data units.

Yet another aspect relates to a computer program product that can comprise a computer-readable medium that comprises code for identifying at least one packet obtained from a first data source; code for identifying one or more indicators that facilitate maintenance of sequence between the at least one packet obtained from the first data source and at least one packet obtained from a second data source; and code for receiving at least one packet from the second data source based on the one or more identified indicators in a continuous manner such that sequence of the packets is maintained.

Still another aspect relates to an integrated circuit that executes computer-executable instructions for efficiently transitioning from a first access point to a second access point. The instructions can comprise receiving data from the first access point in a predetermined sequence based on respective sequence numbers associated with the data; identifying one or more of a sequence jump or a reset command associated with a handover from the first access point to the second access point; determining an initial sequence number for data communicated by the second access point based on one or more of an identified sequence jump or an identified reset command; and receiving data from the second access point, wherein the data from the second access point maintains the sequence of the data received from the first access point beginning with the determined initial sequence number.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
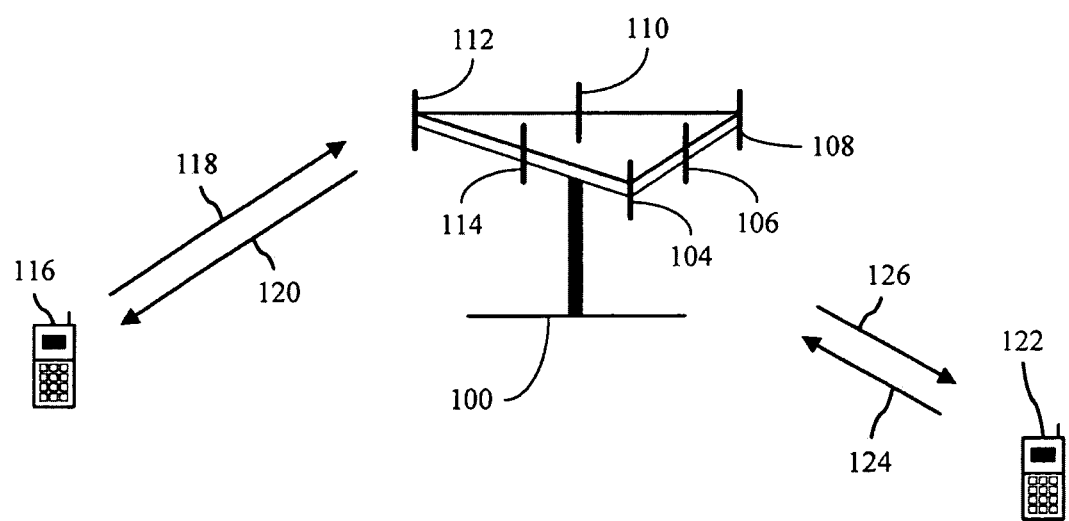
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
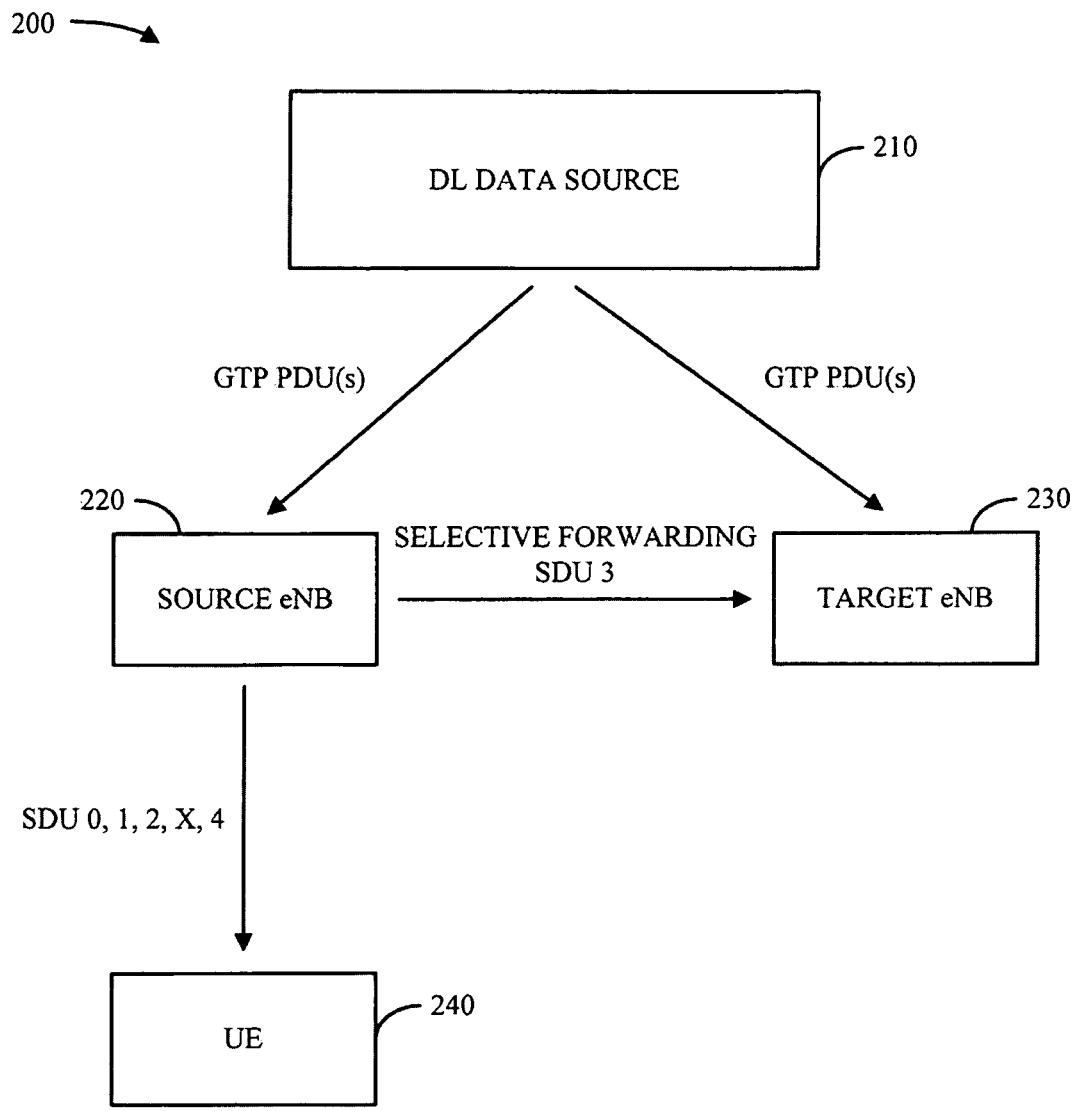
FIG. 2 illustrates an example handover operation that can be performed in a wireless communication system in accordance with various aspects.

FIG. 2 is a block diagram that illustrates an example handover operation in a wireless communication system 200 in accordance with various aspects described herein. In accordance with one aspect, system 200 can include one or more Evolved Node B (eNBs) 220 and 230, which can provide communication functionality for user equipment (UE) 240 pursuant to 3GPP E-UTRAN and/or another suitable communication standard. In one example, eNBs 220 and/or 230 can implement functionality associated with a Radio Access Network (RAN) and/or a Core Network (CN). RAN functionality can be utilized, for example, to communicate data and/or other information to and/or from one or more UEs 240. Additionally and/or alternatively, CN functionality can be utilized, for example, to communicate with one or more data networks to obtain information from and/or provide information to said networks.

As system 200 further illustrates, an eNB 220 and/or 230 can communicate data to one or more UEs 240. In one example, data can be encapsulated into respective data packets, which can be Service Data Units (SDUs) and/or any other suitable encapsulation. Upon encapsulation, SDUs and/or other packets can then be transmitted by eNB(s) 220 and/or 230 to a UE 240 using Packet Data Convergence Protocol (PDCP) and/or another suitable communication protocol. As additionally illustrated by system 200, data to be transmitted to a UE 240 can be provided by a downlink (DL) data source 210. It should be appreciated that while DL data source 210 is illustrated as a stand-alone network entity, DL data source 210 could alternatively be implemented by an eNB 220 and/or 230 and/or any other appropriate entity by generating and/or otherwise providing data for a UE 240. As further illustrated by system 200, data provided by DL data source 210 can be encapsulated as one or more General Packet Radio Service Tunneling Protocol (GTP) Protocol Data Units (PDUs) and/or another suitable encapsulation. Upon receiving data at an eNB 220 and/or 230, data can then be re-encapsulated prior to communication to a UE 240.

In accordance with another aspect, when a UE 240 moves outside the coverage area of a serving eNB or otherwise requests the communication service of another eNB, a handover procedure can be conducted wherein communication service for the UE 240 is transferred from a source eNB 220 to a target eNB 230. In one example, system 200 can utilize selective forwarding of SDUs during a handoff operation from source eNB 220 to target eNB 230. For example, as illustrated by system 200, source eNB 220 can transmit SDUs having sequence numbers of 0-4 prior to handoff. In the example illustrated by system 200, SDUs 0, 1, 2, and 4 are correctly received while SDU 3 is not correctly received and is represented at UE 240 as "SDU X." Accordingly, during handoff, selective forwarding and re-transmission can be applied to provide target eNB 230 with SDU 3 for re-transmission to UE 240. In one example, SDU(s) can be forwarded from source eNB 220 to target eNB 230 via a X2 interface directly from source eNB 220 to target eNB 230, via an S1 interface (e.g., through an access gateway or AGW), and/or via any other suitable network interface.

In one example, it can be required pursuant to PDCP and/or another protocol utilized by system 200 that packets are to be transmitted to a UE in sequence. Thus, in the example illustrated by system 200, following re-transmission of selectively forwarded SDUs, the sequence of packets provided to UE 240 is to be maintained from packets transmitted by source eNB 220 before handover to packets transmitted by target eNB 230 after handover. However, in the example illustrated by system 200, data are obtained by target eNB 230 from DL data source 210 in the form of GTP PDUs and/or another similar encapsulation that does not provide sequence information. Accordingly, as the only information known to target eNB 230 regarding the sequence of SDUs is obtained from forwarded packets from source eNB 220, target eNB 230 can encounter significant difficulty in determining an appropriate sequence number (SN) to apply to SDUs for UE 240 following re-transmission of the forwarded packets. As a result, data delivery to UE 240 can be significantly delayed at handoff.

Existing data processing techniques have been ineffective for mitigating delays associated with packet reordering at handoff as described above. In the example illustrated by system 200, data corresponding to a SDU with a SN of 3 is forwarded from source eNB 220 to target eNB 230 at handoff. However, subsequent packets from DL data source 210 are generally obtained as GTP PDUs that do not contain sequence information. Upon receiving such data, target eNB 230 must then assign a PDCP SN to the data prior to transmission to UE 240. However, after re-transmitting the SDU from source eNB 220 with SN 3, and waiting for a path switch to occur, difficulty is encountered in determining a proper SN for an initial subsequent packet for UE 240. For example, it can be observed from system 200 that assigning an initial SN of 4 for an initial subsequent packet is undesirable as SN 4 has already been used and an SDU with SN 4 has already been buffered by UE 240. Submitting a new SDU with SN 4 to UE 240 would result in a loss of user data, since one of the SDUs would be treated as a duplicate and therefore eliminated.

Similarly, it can be appreciated that submitting an initial subsequent SDU to UE 240 with a SN of 3+delta causes significant delay at UE 240 as UE 240 must deliver packets to upper layers in order. For example, if an initial SN of 3+delta is utilized, UE 240 will deliver PDUs 3 and 4 to the upper layer. Upon then identifying a PDU with SN 3+delta, UE 240 will then wait due to a perceived gap between SN 5 and SN (3+delta)−1. In one example, UE 240 relies on a timer to identify when to deliver data following such a gap in a non-handoff scenario. A similar timer can be utilized during a handoff, provided the timer is sufficiently long to cover interruption due to handoff and forwarding delays. Thus, it can be appreciated that if this timer is used when target eNB 230 jumps the SN by delta, UE 240 will incur timer-related delays at every handoff.

Thus, in accordance with one aspect, system 200 can be operable to mitigate processing delays associated with PDCP reordering of SDUs at handoff by determining, communicating, and/or otherwise identifying one or more indicators during handoff that facilitate lossless communication of SDUs to UE 240 with minimal delay. These indicators can include, for example, SN information provided by source eNB 220 to target eNB 230, information regarding a step or jump size applied by target eNB 230 at handoff, a reset indication and/or command, and/or other suitable indicators. Examples of indicators that can be utilized are described in more detail infra.

In accordance with another aspect, existing wireless communication systems (e.g., LTE systems and/or other suitable wireless communication systems) define only a single PDCP behavior for Data Radio Bearers (DRBs) mapped onto Radio Link Control Acknowledged Mode (RLC AM) at handover. In particular, the PDCP SN and hyperframe number (HFN), which form a 32-bit COUNT sequence number used in PDCP for ciphering, are maintained from the source eNB 220 to the target eNB 230, as well as in the UE 240. This behavior is typically utilized to enable lossless handover with selective forwarding of PDCP SDUs, thereby facilitating in-order data delivery, mitigated duplication, and status reporting. In order to maintain this state from source eNB 220 to target eNB 230, a message containing the COUNT is transmitted from source eNB 220 to target eNB 230. In one example, this message is denoted as SN TRANSFER STATUS.

However, it can be appreciated that for some systems that utilize DRB mapped onto RLC AM, lossless handover features may not be useful. Further, in the case of radio link failure recovery, it is not always possible to maintain COUNT through a handover. In addition, in a system where the SN TRANSFER STATUS message is optional, when such a message is not transmitted the target eNB 230 is not provided with a mechanism for determining COUNT. In such a case target eNB 230 is generally forced to reset COUNT to 0, which requires a UE 240 with which target eNB 230 communicates to do the same in order to be kept in sync.

Accordingly, to mitigate the above shortcomings, system 200 can support handover operation in both the case where COUNT is maintained from source eNB 220 to target eNB 230 and in the UE 240 and the case where COUNT is not maintained from source eNB 230 to target eNB 230 and/or in the UE 240. In one example, system 200 can provide flexibility to operate in either of the foregoing cases by providing an indication to UE 240 that notifies UE 240 as to where the COUNT is maintained for a given radio bearer and for a given handover. It can be appreciated that this indication can take various forms. By way of non-limiting example, an indication to UE 240 can include a RRC (Radio Resource Control) RECONFIGURATION message in the case of a handover wherein the value of COUNT is chosen by target eNB 230, a RRC CONNECTION RE-ESTABLISHMENT message in the case of radio link failure recovery, a PDCP Control message utilized by an eNB 220 and/or 230 to indicate how UE 240 must set COUNT, and/or any other suitable indication.

Figure 3:
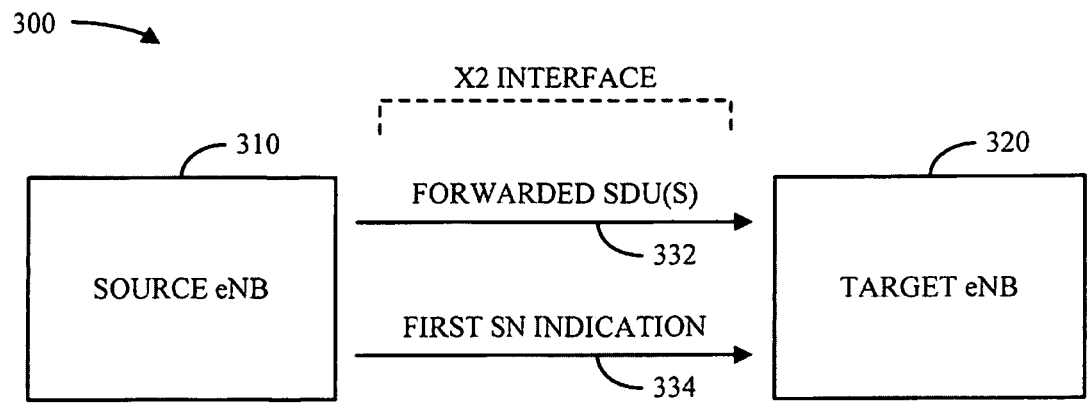
FIGS. 3-6 are block diagrams of respective systems for managing packet forwarding during a handoff procedure in accordance with various aspects.

FIG. 3 illustrates an example system 300 for management of a handoff from a source eNB 310 to a target eNB 320. As system 300 illustrates, during a handoff operation, source eNB 310 can selectively forward one or more SDUs 332 to target eNB 320 over an X2 interface between eNBs 310 and 320 for re-transmission after the handoff operation. However, as described above with regard to system 200, target eNB 320 can encounter difficulty in determining a SN to apply to subsequently delivered data packets based on forwarded SDUs 332 alone. Accordingly, in one example, source eNB 310 can provide an indication 334 of the first SN to assign to the first SDU transmitted by target eNB 320. The first SDU can be, for example, an initial packet received on an S1 interface, a packet forwarded on the X2 interface without an assigned PDCP sequence number, and/or a packet transmitted over any other suitable network interface.

In accordance with one aspect, a first SN indication 334 can be an indication of a highest SN used by source eNB 310 and/or an indication of a next available SN (e.g., the highest SN used by source eNB 310 plus 1). By way of specific example, if a highest SN used by source eNB is 4, a first SN indication 334 can indicate either 4 (e.g., the last-used SN) or 5 (e.g. the next available SN). By utilizing first SN indications 334 in this manner, target eNB 320 can maintain sequence continuity between SDUs transmitted by source eNB 310 and SDUs transmitted by target eNB 320, thereby allowing a receiving UE to re-order packets due to selective forwarding and deliver the packets to upper layers without delay. It can further be appreciated that, as continuity of SN is maintained, a UE to which eNBs deliver SDUs can receive said SDUs without a gap in PDCP SN provided no Radio Link Control (RLC) SDUs are lost.

Figure 4:
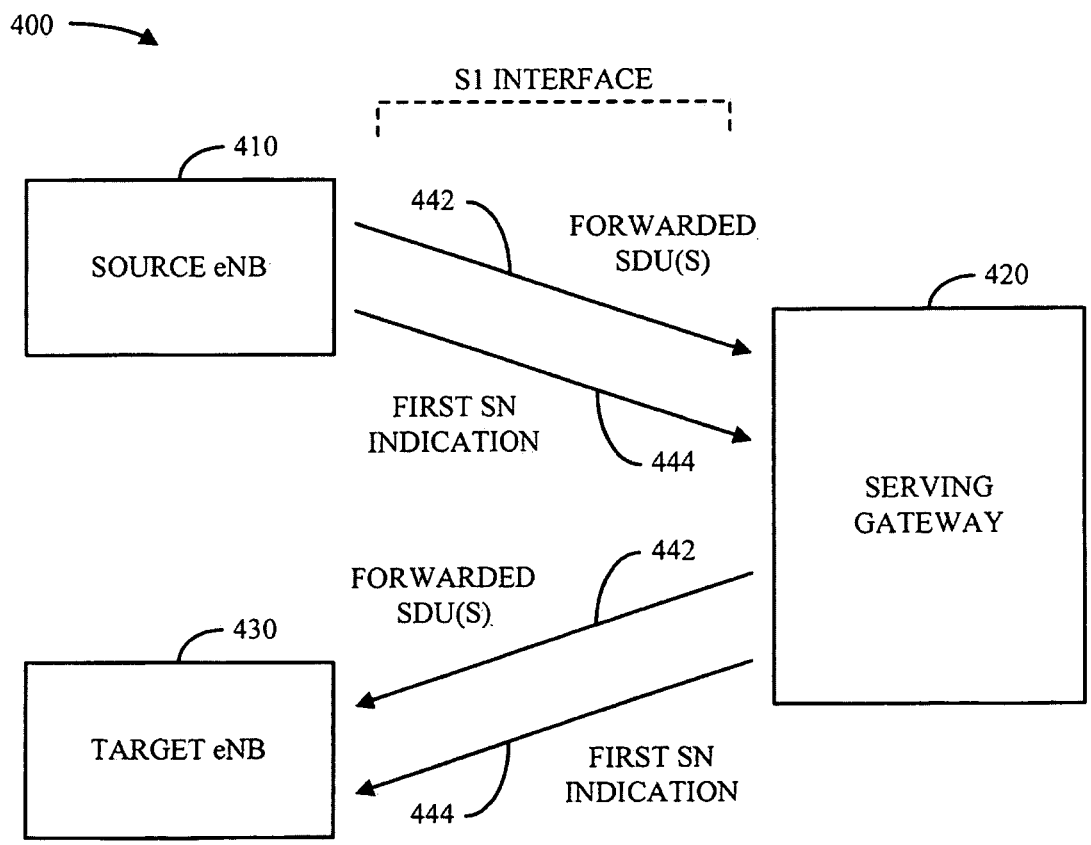

FIG. 4 illustrates an alternative example system 400 for management of a handoff from a source eNB 410 to a target eNB 430 via first SN indication(s) 444. In a similar manner to that described with regard to system 300, source eNB 410 can forward one or more SDUs 442 to target eNB 430 in combination with a first SN indication 444. The first SN indication 444 can indicate, for example, a last-used SN at source eNB 420 and/or a next available SN (e.g., a last-used SN plus 1).

In accordance with one aspect, if an X2 interface between source eNB 410 and target eNB 430 as illustrated in system 300 is not available, SDUs 442 and/or indications 444 can instead be transmitted over an S1 interface and/or another suitable interface on which data can be received at target eNB 430. In one example, a serving gateway (SGW) 420 can further be utilized to coordinate communication on the S1 interface and/or to relay packets over the S1 interface from source eNB 410 to target eNB 430 and/or vice versa.

Figure 5:
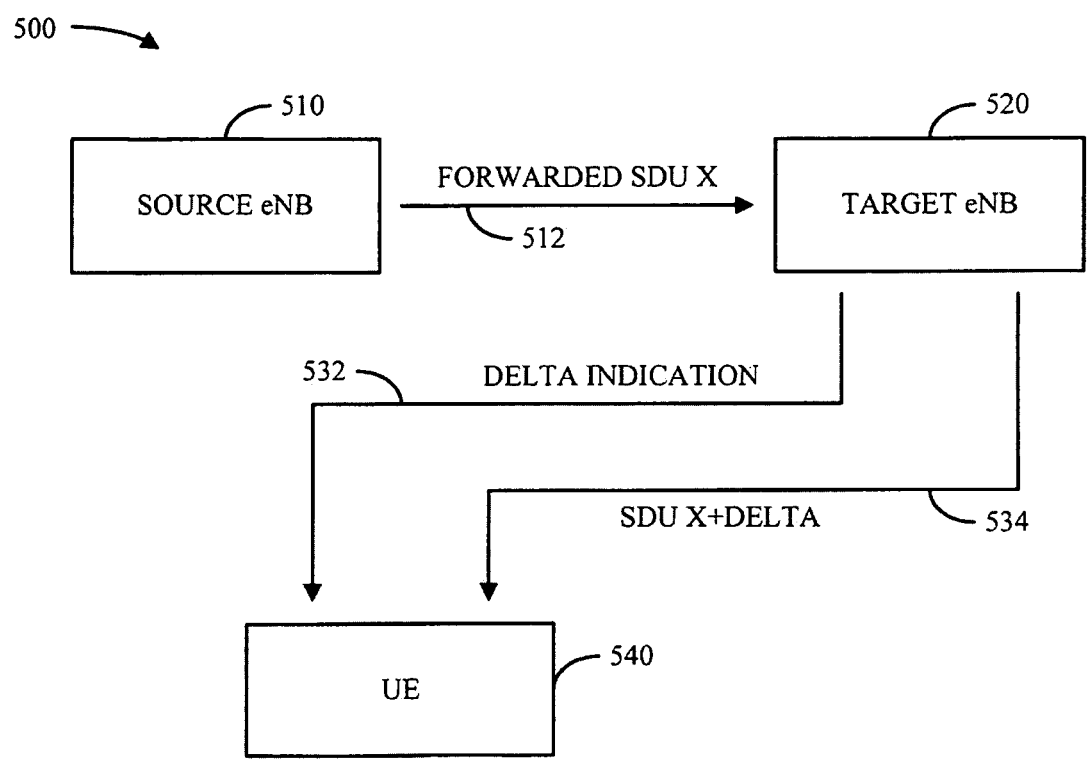

FIG. 5 illustrates another example system 500 for management of a handover from a source eNB 510 to a target eNB 520. As system 500 illustrates, source eNB 510 can forward one or more SDUs 512 to target eNB 520 during a handover operation. In one example, SDUs 512 can be received at target eNB 520 over an X2 interface directly from source eNB 510, over an S1 interface or another suitable air interface from source eNB 510 or a gateway, or by other appropriate means.

Upon receiving forwarded SDUs 512, target eNB 520 can utilize PDCP to transmit the SDUs 512 to one or more UEs 540 using the SNs indicated therefor by source eNB 510.

It can be appreciated that when target eNB 520 transmits packets which are not provided with a sequence number, either over the X2 interface, the S1 interface, and/or another suitable network interface, the PDCP may leave a gap in SN between forwarded SDU(s) 512 and subsequent SDUs in order to avoid reusing SNs that have already been used by source eNB 510 and that are already buffered by UE 540. Thus, in the event that target eNB 520 does not know how many such SDUs exist, target eNB 520 can begin transmitting SDUs to UE 540 subsequent to forwarded SDU(s) 512 beginning with a last seen SN of a forwarded SDU 512 (denoted in system 500 as X) plus a step size delta. However, as described supra, the conventional solution to utilizing a SN step value of delta involves a conservative timer to enable PDCP to perform in-order delivery, which causes delays at UE 540 at every handover. Accordingly, to mitigate these delays, an aspect illustrated by system 500 facilitates delivery of a delta indication 532 to alert UE 540 that a jump in SN is forthcoming, thereby allowing UE 540 to process incoming SDUs without delays caused by a gap in SN. Alternatively, target eNB 520 can indicate to UE 540 over the air with a signaling message that all buffered packets can be delivered, even with gaps, after target eNB 520 determines that it is finished transmitting packets forwarded by source eNB 510, thereby allowing UE 540 to deliver packets even before an associated timer expires. In one example, target eNB 520 can determine that it has finished transmitting packets forwarded from source eNB 510 based on reception of a "last packet" marker from source eNB 510, an internal path switch timer, and/or any other appropriate means.

For example, after sending a last seen forwarded SDU 512 with SN X, target eNB 520 can utilize a control message containing an indication 532 that it will next jump to SN X+delta. In accordance with one aspect, a delta indication 532 can provide, for example, the value of delta, an indication of the fact that a jump is to occur, and/or any other information sufficient to alert UE 540 of an impending jump in SN from previously received SDUs. In one example, target eNB 520 can provide a SDU 534 with SN X+delta to UE 540 following a delta indication 532, which can be processed by UE 540 without a delay for receiving a SDU with a, SN lower than X+delta. As a result, it can be appreciated that by utilizing delta indication 532, UE 540 is enabled to deliver SDU X+delta 534 immediately without waiting for a timer.

In a further non-limiting example, a SN step size delta can be pre-configured within system 500 such that delta is known to UE 540 prior to a handover without requiring a delta indication 532 from target eNB 520 at each handover. For example, if a given size of delta is pre-configured and known to UE 540, at handover target eNB can simply provide an SDU 534 with SN X+delta to UE 540. Based on the prior knowledge of delta at UE 540, UE 540 can deliver the SDU immediately without requiring an explicit delta indication 532.

Figure 6:
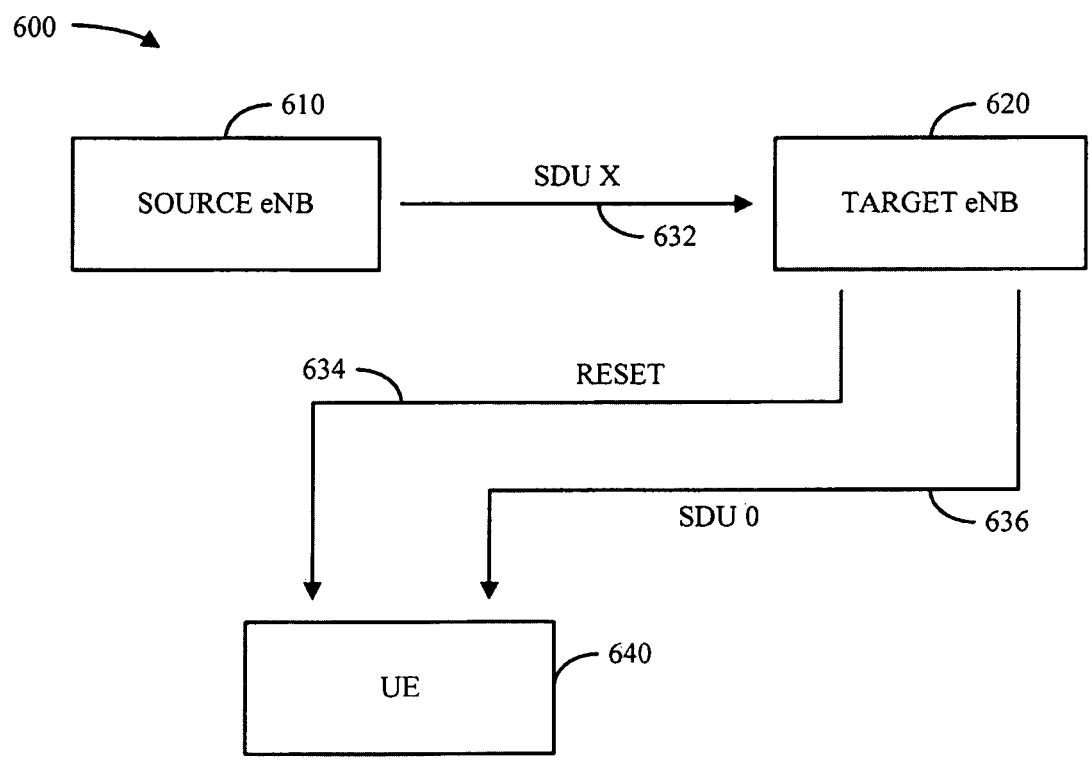

FIG. 6 illustrates a further example system 600 for managing a handoff from a source eNB 610 to a target eNB 620. As system 600 illustrates, during handoff, source eNB 610 can forward one or more SDUs 632 to target eNB 620. Upon identification of the forwarded SDUs 632 at target eNB 620, the SDUs 632 can subsequently be provided to a UE 640.

In accordance with one aspect, to facilitate in-order upper layer delivery of SDUs by UE 640 with minimal delay, PDCP can be reset before or after target eNB 620 finishes transmitting SDUs 632 received from source eNB 610. For example, as system 600 illustrates, target eNB 620 can provide a reset command 634 to UE 640, after which target eNB can provide an initial SDU 636 to UE having a SN set to a predetermined reset value. While system 600 illustrates an initial SDU 636 with SN 0, it should be appreciated that any suitable predetermined SN could be utilized.

In one example, a reset as illustrated by system 600 can be synchronized with the occurrence of a handoff. Additionally and/or alternatively, reset and/or continuation of a PDCP sequence number can be configured for respective radio bearers, such as, for example, radio bearers mapped onto a RLC Unacknowledged Mode (UM) and/or signaling radio bearers (SRBs), such that a single reset indication 634 can be provided at the setup of a radio bearer, thereby rendering it unnecessary to indicate a reset and/or continuation of sequence number for each handoff. By way In accordance with another aspect, a reset can occur after all PDCP SDUs forwarded from source eNB 610, with their sequence numbers, have been transmitted by target eNB 620. Target eNB 620 can identify an end of forwarding by, for example, detecting a packet marking the end of forwarding provided by source eNB 610. In one example, after forwarding ends, the PDCP in target eNB 620 can reset and provide a reset indication 634 to UE 640 in a substantially simultaneous manner. In such an example, transmission of subsequent PDCP SDU can utilize the predetermined starting sequence number for a reset.

In accordance with another aspect, various techniques as illustrated by systems 300-600 can be utilized in combination for one or more communication types and/or tunnels. By way of example, data communication can utilize a first technique as illustrated systems 300-600 while voice communication can utilize a second, disparate technique.

Referring to FIGS. 7-13, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
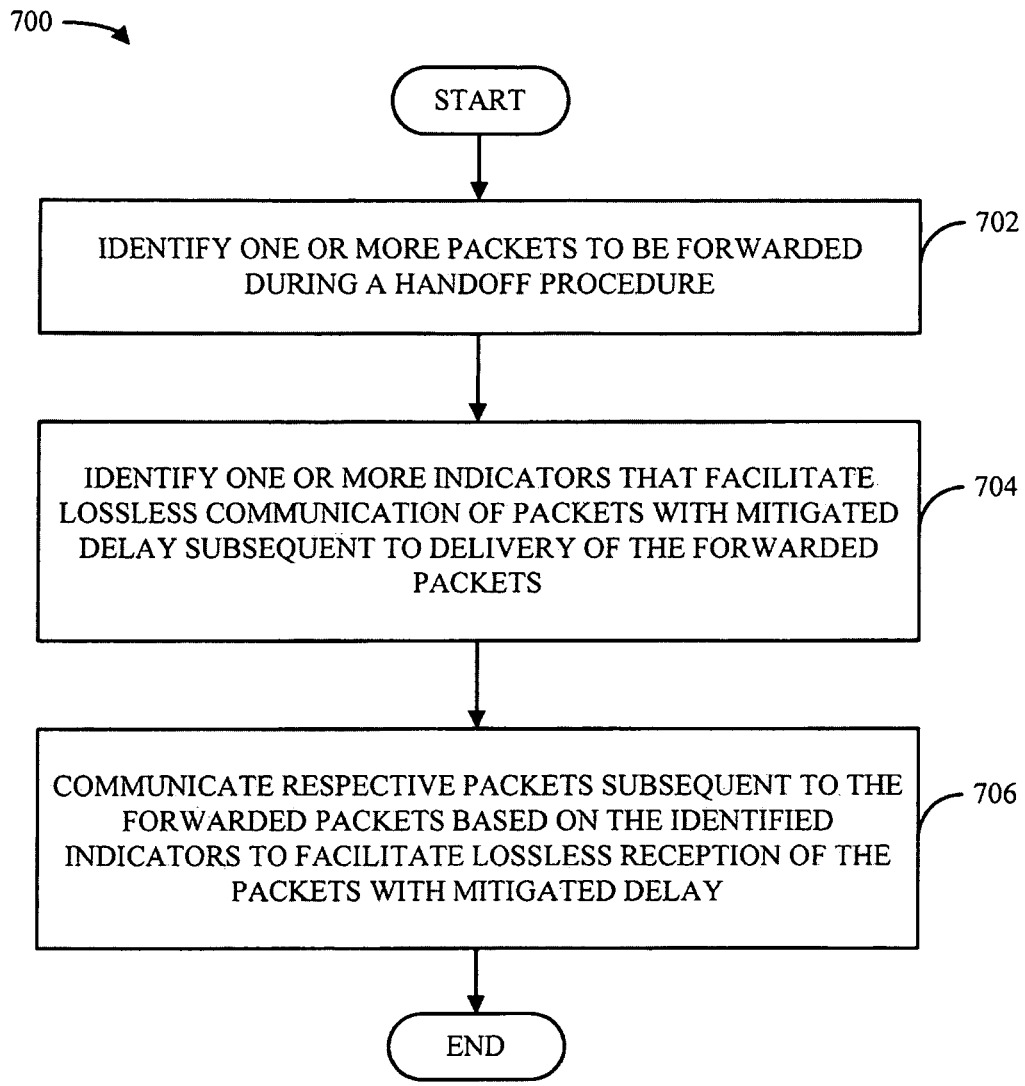
FIGS. 7-10 are flow diagrams of respective methodologies for coordinating data delivery through a handover operation.

With reference to FIG. 7, illustrated is a methodology 700 for coordinating data delivery through a handover operation in a wireless communication system (e.g., system 200). It is to be appreciated that methodology 700 can be performed by, for example, a wireless access point (e.g., eNB 220 and/or 230) and/or any other appropriate network entity. Methodology 700 begins at block 702, wherein one or more packets to be forwarded during a handoff procedure (e.g., for communication to one or more UEs 240) are identified. Next, at block 704, one or more indicators are identified that facilitate lossless communication of packets with mitigated delay subsequent to delivery of the forwarded packets identified at block 702. Indicators identified at block 704 can include, for example, a first SN indication (e.g., first SN indication 334 and/or 444), a delta indication (e.g., delta indication 532), a reset command (e.g., reset indication 634), and/or any other suitable indicator. Methodology 700 can then conclude at block 706, wherein respective packets are communicated subsequent to the forwarded packets identified at block 702 based on the indicators identified at block 704 to facilitate lossless reception of the packets with mitigated delay.

Figure 8:
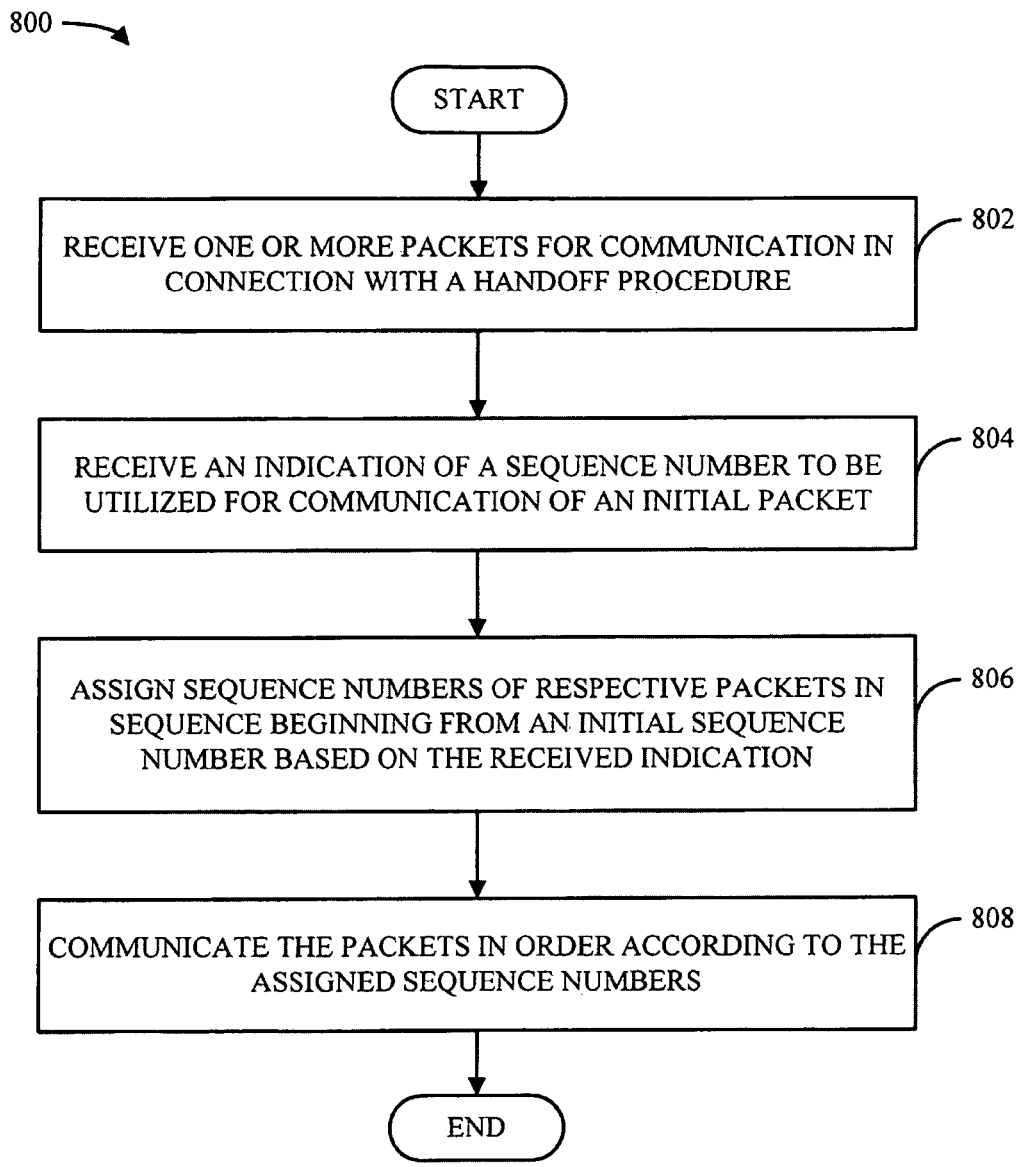

FIG. 8 illustrates a methodology 800 for coordinating data delivery through a handover operation based on forwarded SN information. Methodology 800 can be performed by, for example, a base station and/or any other appropriate network entity. Methodology 800 begins at block 802, wherein one or more packets for communication in connection with a handoff procedure are identified. Next, at block 804, an indication of a SN to be utilized for communication of an initial packet is identified. In accordance with one aspect, an indication received at block 804 can provide information relating to a SN last used by an entity from which the indication is received and/or a next available SN (e.g. the last used SN plus 1). Further, an indication at block 804 can be received over an X2 interface and/or another suitable interface from a source base station. Additionally and/or alternatively, an indication can be received at block 804 over an S1 and/or another appropriate interface from a SGW or the like.

Methodology 800 can then proceed to block 806, wherein sequence numbers of respective packets are assigned in sequence beginning from an initial sequence number that is based on the indication received at block 804. Methodology 800 can then conclude at block 808, wherein the packets to which sequence numbers are assigned at block 806 are communicated according to the assigned sequence numbers.

Figure 9:
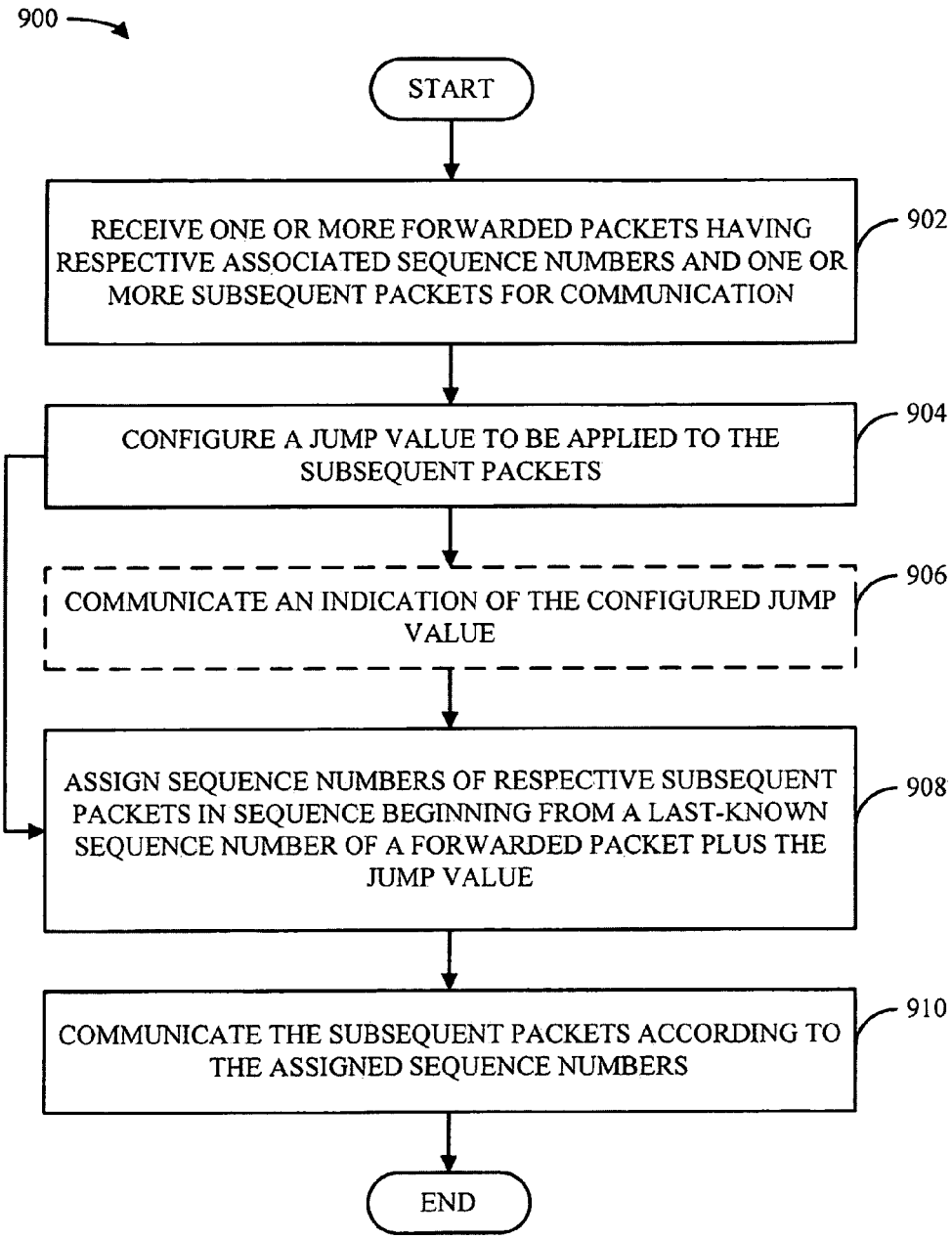

FIG. 9 is a flow diagram that illustrates a methodology 900 for managing data delivery at handoff based on a step size indication. It is to be appreciated that methodology 900 can be performed by, for example, a Node B and/or any other appropriate network entity. Methodology 900 begins at block 902, wherein one or more forwarded packets having respective associated sequence numbers and one or more subsequent packets are received for communication. Methodology 900 can then proceed to block 904, wherein a jump value to be applied to the subsequent packets received at block 902 is configured.

Next, methodology 900 can continue to block 906, wherein an indication of the jump value configured at block 904 is communicated. In accordance with one aspect, an indication communicated at block 906 can include the jump value configured at block 904 and/or an indication that a jump value is to be applied to subsequent packets. Further, as FIG. 9 illustrates, the act described at block 906 is optional and can be omitted if, for example, the jump value configured at block 904 is known a priori to the destination of the packets communicated in methodology 900. In another example, following transmission of forwarded packets at block 902, an indication can be transmitted over the air at block 906 that all subsequent packets can be delivered despite any gaps in sequence number that may occur therebetween, thereby allowing processing of such packets without delay.

Methodology 900 next proceeds to block 908, wherein sequence numbers of respective subsequent packets received at block 902 are assigned in order beginning from a last-known SN of a forwarded packet received at block 902 plus the jump value configured at block 904. Finally, methodology 900 can conclude at block 910, wherein the subsequent packets are communicated according to the sequence numbers assigned at block 908.

Figure 10:
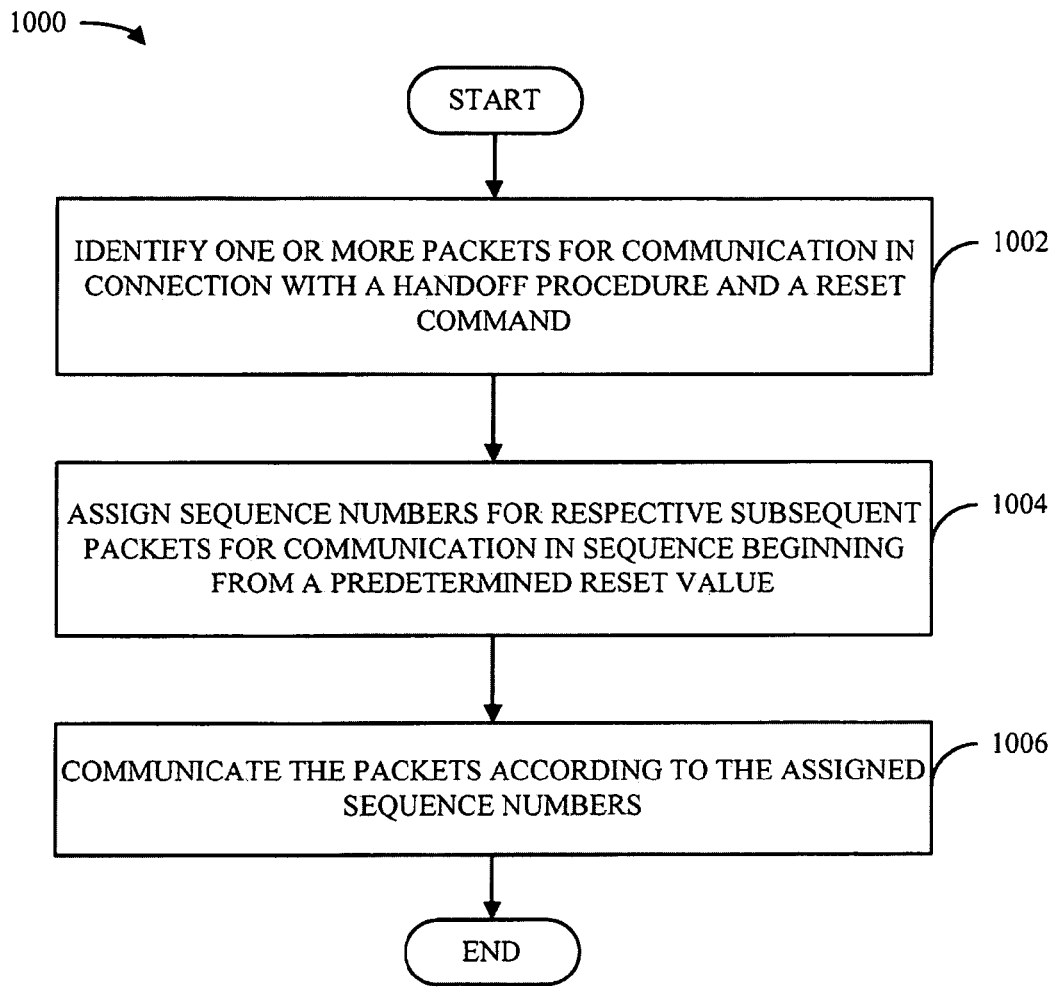

FIG. 10 illustrates a methodology 11000 for coordinating data delivery through a handover operation based on a reset command. Methodology 1000 can be performed by, for example, an eNB and/or any other appropriate network entity. Methodology 1000 begins at block 1002, wherein one or more packets for communication in connection with a handoff procedure and a reset command are identified. Next, at block 1004, sequence numbers are assigned for respective subsequent packets beginning from a predetermined reset value. Methodology 1000 can then conclude at block 1006, wherein the packets for which sequence numbers are assigned at block 1004 are communicated according to the assigned sequence numbers. In one example, the reset command identified at block 1002 can additionally be provided at block 1006.

Figure 11:
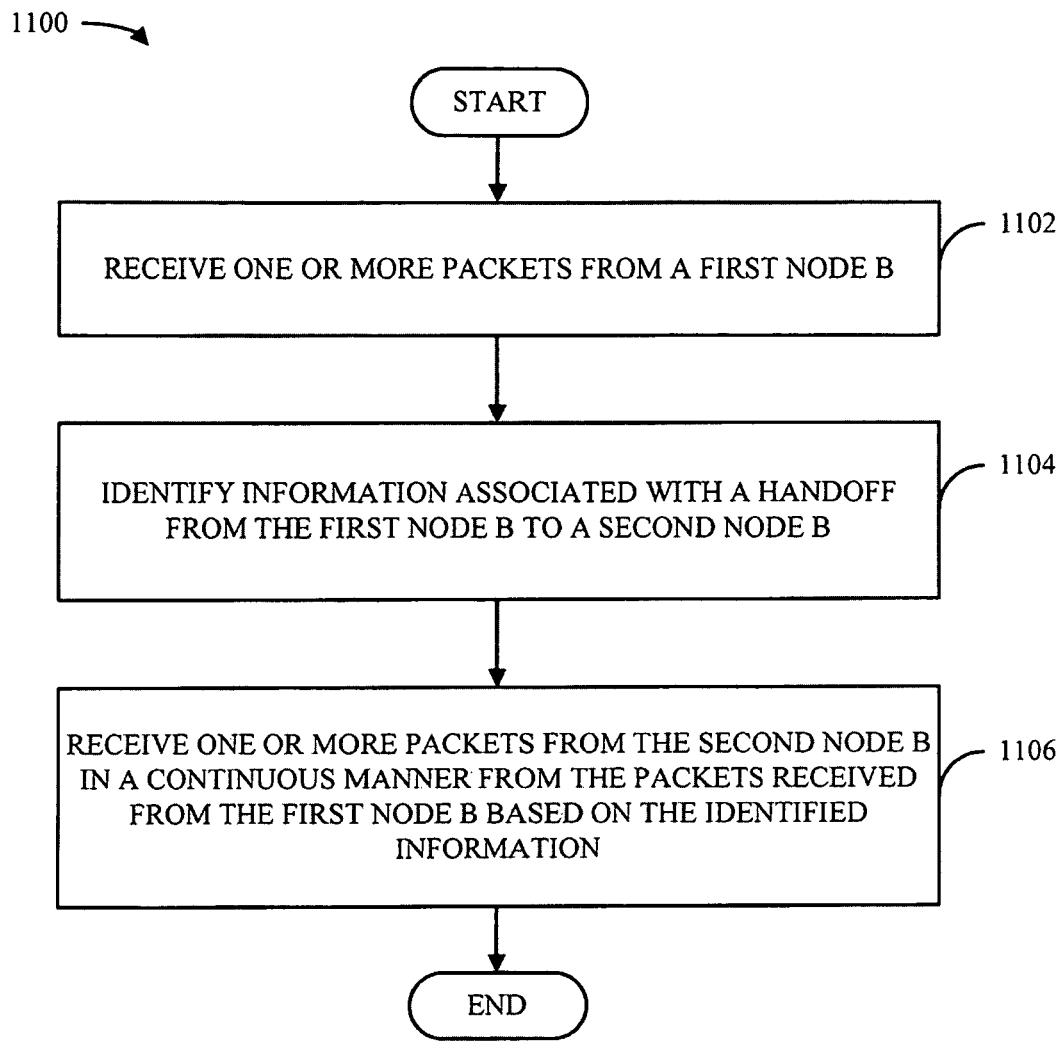
FIGS. 11-13 are flow diagrams of respective methodologies for receiving and processing data packets.

With reference now to FIG. 11, illustrated is a methodology 1100 for receiving and processing data packets in a wireless communication system (e.g., system 200). It is to be appreciated that methodology 1100 can be performed by, for example, a mobile device (e.g., UE 240) and/or any other appropriate network entity. Methodology 1100 begins at block 1102, wherein one or more packets are received from a first Node B. Next, at block 1104, information associated with a handoff from a first Node B to a second Node B is identified. Information identified at block 1104 can include, for example, information relating to a SN jump applied to packets transmitted from the second Node B following packets forwarded from the first Node B to the second Node B, information relating to a system reset, an "end marker" signal that indicates the end of forwarded packets from the first Node B, and/or any other suitable information. Finally, at block 1106, one or more packets are received from the second Node B in a continuous manner from the packets received from the first Node B at block 1102 based on the information identified at block 1104. In one example, in the event that an "end marker" signal is indicated by the second Node B, all packets received and buffered at block 1106 up to an indicated sequence number can be delivered even if gaps are present in the sequence numbers associated with the packets.

Figure 12:
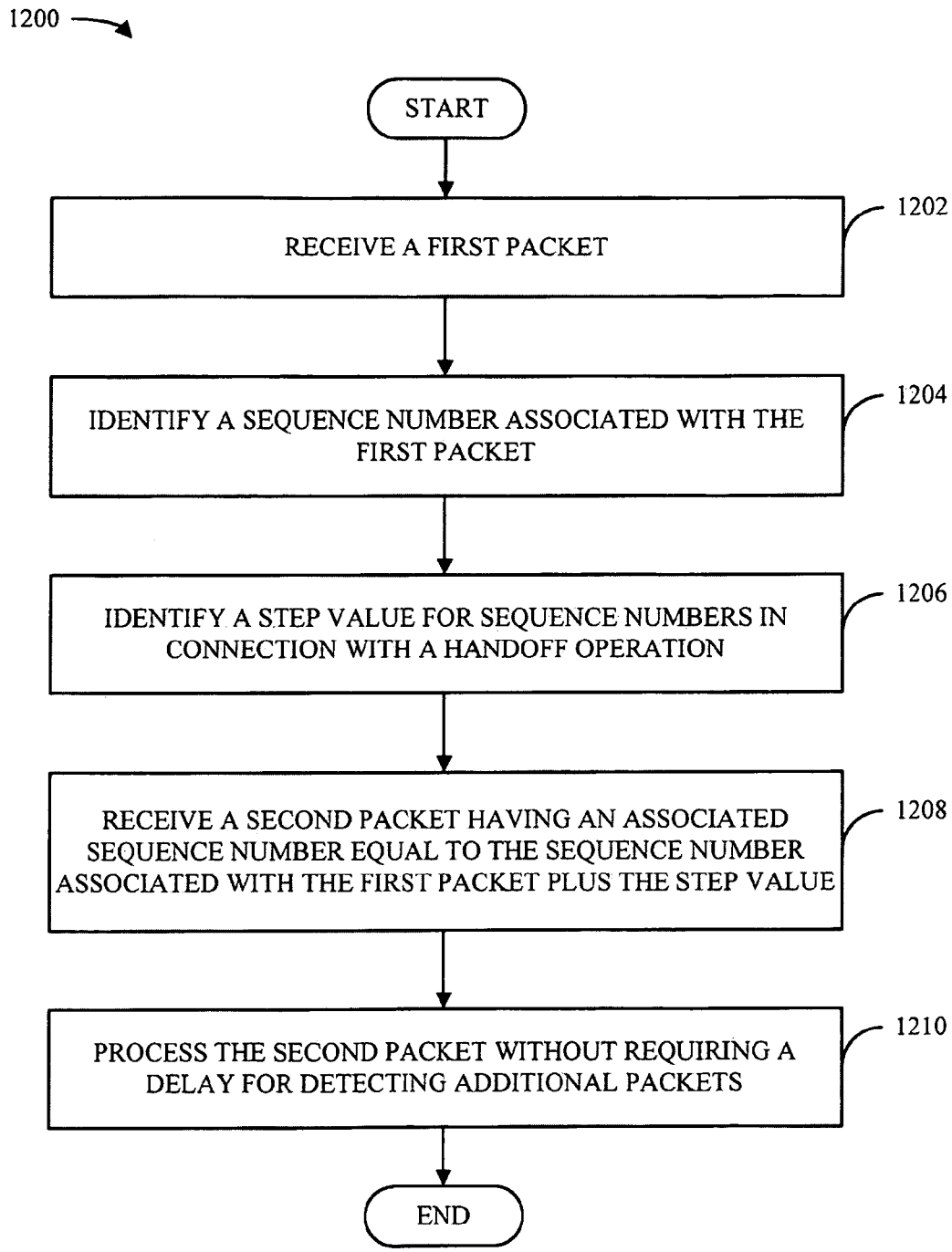

FIG. 12 illustrates a methodology 1200 for receiving and processing data packets during a handoff operation based on a sequence jump indication. Methodology 1200 can be performed by, for example, a UE and/or any other appropriate network entity. Methodology 1200 begins at block 1202, wherein a first packet (e.g. a packet forwarded from a first access point to a second access point during a handoff operation) is received. Next, at block 1204, a sequence number associated with the first packet received at block 1202 is identified. Methodology 1200 can then continue to block 1206, wherein a step value for sequence numbers in connection with a handoff operation is identified. In one example, the step value can be known to an entity performing methodology 1200 prior to a related handoff operation. Alternatively, an entity performing methodology 1200 can receive information relating to application of the step value and/or the step value itself from an access point.

Upon completing the acts described at block 1206, methodology 1200 can continue to block 1208, wherein a second packet is received that has an associated sequence number equal to the sequence number associated with the first packet identified at block 1204 plus the step value identified at block 1206. Methodology 1200 can then conclude at block 1210, wherein the second packet is processed without requiring a delay for detecting additional packets.

Figure 13:
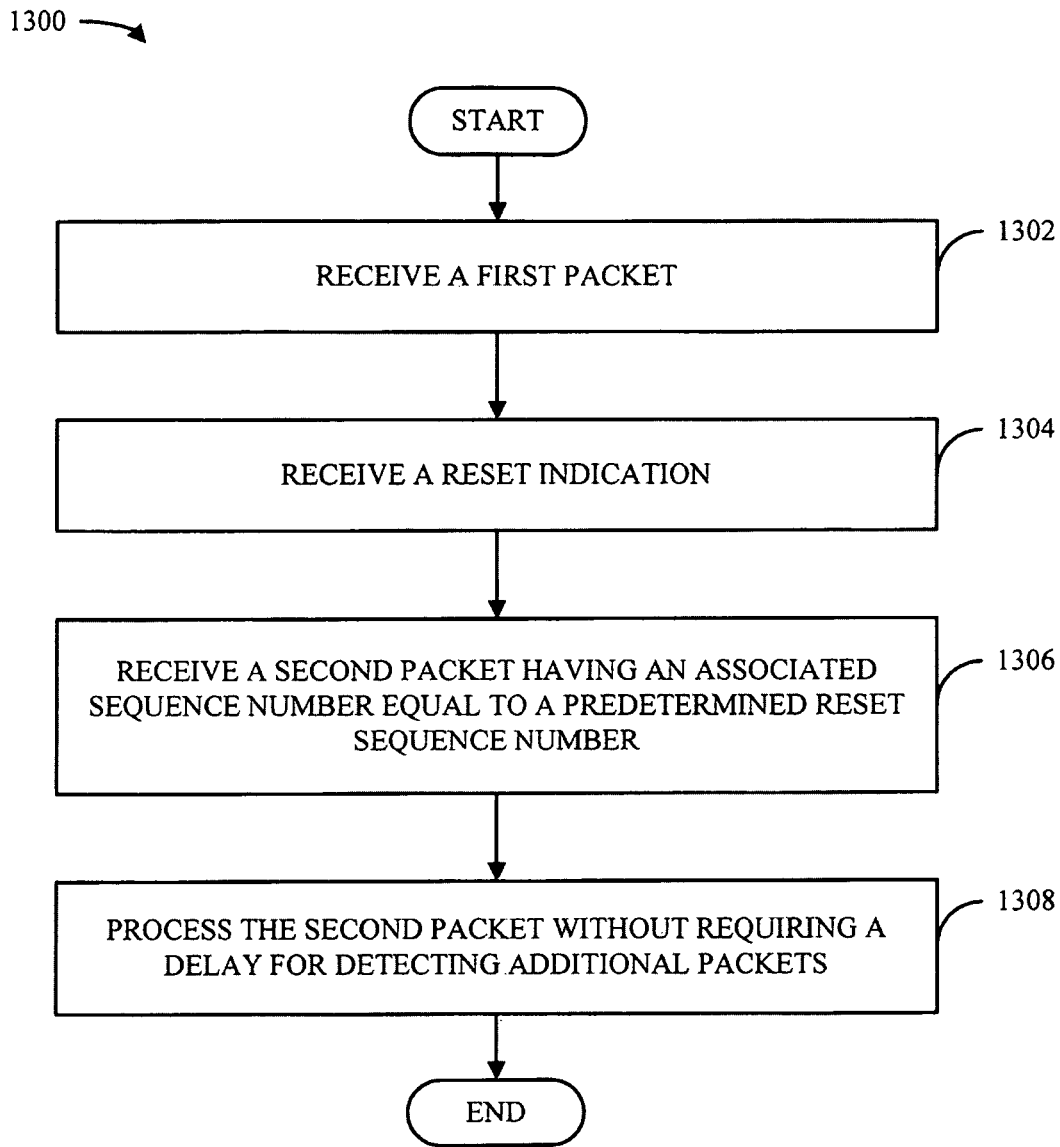

FIG. 13 is a flow diagram that illustrates a methodology 1300 for receiving and processing data packets during a handover operation based on a system reset. Methodology 1300 can be performed by, for example, an access terminal and/or another appropriate network entity. Methodology 1300 begins at block 1302, wherein a first packet is received. The first packet can be, for example, a packet forwarded from a first Node B to a second Node B during a handoff operation. Next, at block 1304, a reset indication is received. In one example, a reset indication can be received at block 1304 from any Node B involved in a handover of communication service to the entity performing methodology 1300 and/or any other suitable network entity. In accordance with one aspect, a reset indication received at block 1304 can be implicit. For example, a PDCP entity can be configured to reset without further indication every time a handover occurs.

Upon completing the acts described at block 1304, methodology 1300 continues to block 1306, wherein a second packet is received that has an associated sequence number that is equal to a predetermined reset sequence number. Finally, at block 1308, the second packet received at block 1306 is processed without requiring a delay for detecting additional packets.

Figure 14:
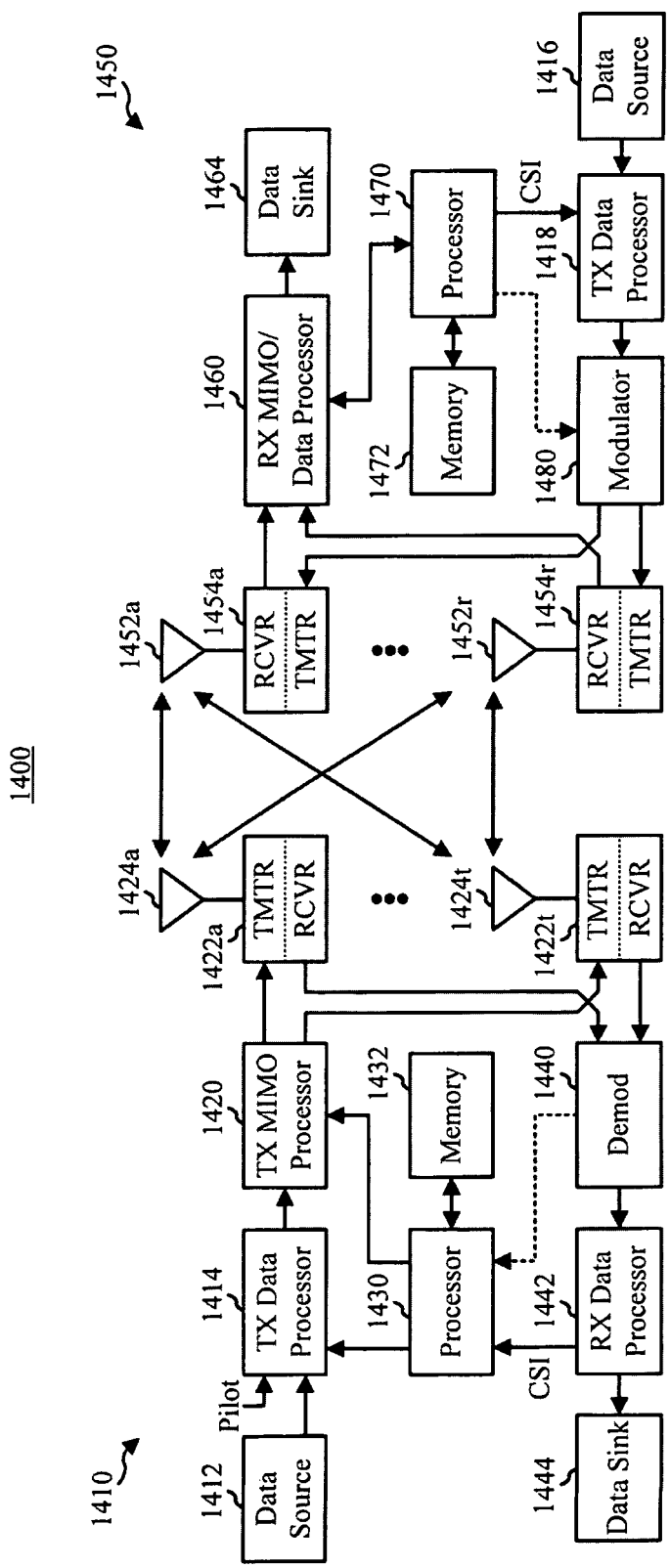
FIG. 14 is a block diagram illustrating an example wireless communication system in which various aspects described herein can function.

Referring now to FIG. 14, a block diagram illustrating an example wireless communication system 1400 in which one or more embodiments described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and upconvert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and downconvert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data steam. RX processor 1460 can then process each symbol stream at least in part by demodulating, deinterleaving, and decoding each detected symbol stream to recover traffic data for a corresponding data stream. Thus, the processing by RX processor 1460 can be complementary to that performed by TX MIMO processor 1420 and TX data processor 1414 at transmitter system 1410. RX processor 1460 can additionally provide processed symbol streams to a data sink 1464.

In accordance with one aspect, the channel response estimate generated by RX processor 1460 can be used to perform space/time processing at the receiver, adjust power levels, change modulation rates or schemes, and/or other appropriate actions. Additionally, RX processor 1460 can further estimate channel characteristics such as, for example, signal-to-noise-and-interference ratios (SNRs) of the detected symbol streams. RX processor 1460 can then provide estimated channel characteristics to a processor 1470. In one example, RX processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 15:
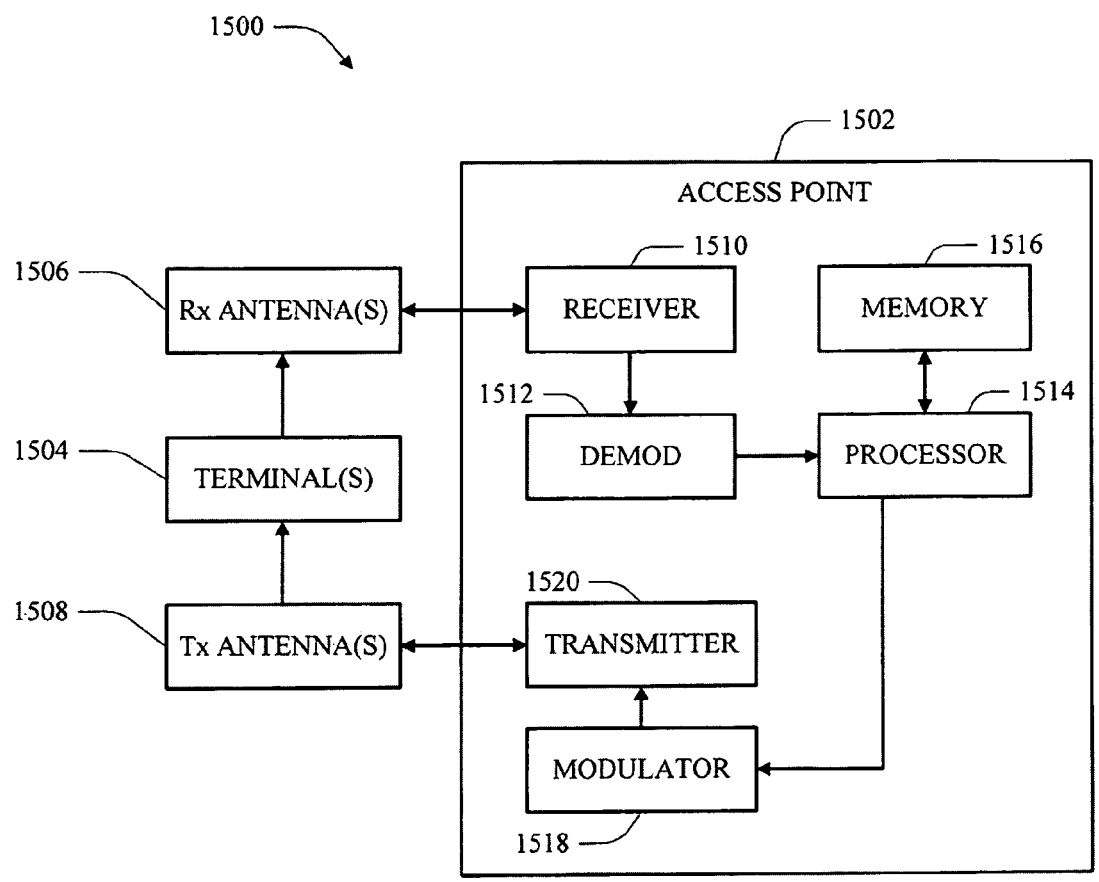
FIGS. 15-16 are block diagrams illustrating example wireless devices that can be operable to implement various aspects described herein.

FIG. 15 is a block diagram of a system 1500 that facilitates management of a handover in a wireless communication system in accordance with various aspects described herein. In one example, system 1500 includes a base station or access point 1502. As illustrated, access point 1502 can receive signal(s) from one or more access terminals 1504 via one or more receive (Rx) antennas 1506 and transmit to the one or more access terminals 1004 via one or more transmit (Tx) antennas 1508.

Additionally, access point 1502 can comprise a receiver 1510 that receives information from receive antenna(s) 1506. In one example, the receiver 1510 can be operatively associated with a demodulator (Demod) 1512 that demodulates received information. Demodulated symbols can then be analyzed by a processor 1514. Processor 1514 can be coupled to memory 1516, which can store information related to code clusters, access terminal assignments, lookup tables related thereto, unique scrambling sequences, and/or other suitable types of information. In one example, access point 1502 can employ processor 1514 to perform methodologies 700, 800, 900, 1000, and/or other similar and appropriate methodologies. Access point 1502 can also include a modulator 1518 that can multiplex a signal for transmission by a transmitter 1520 through transmit antenna(s) 1508.

Figure 16:
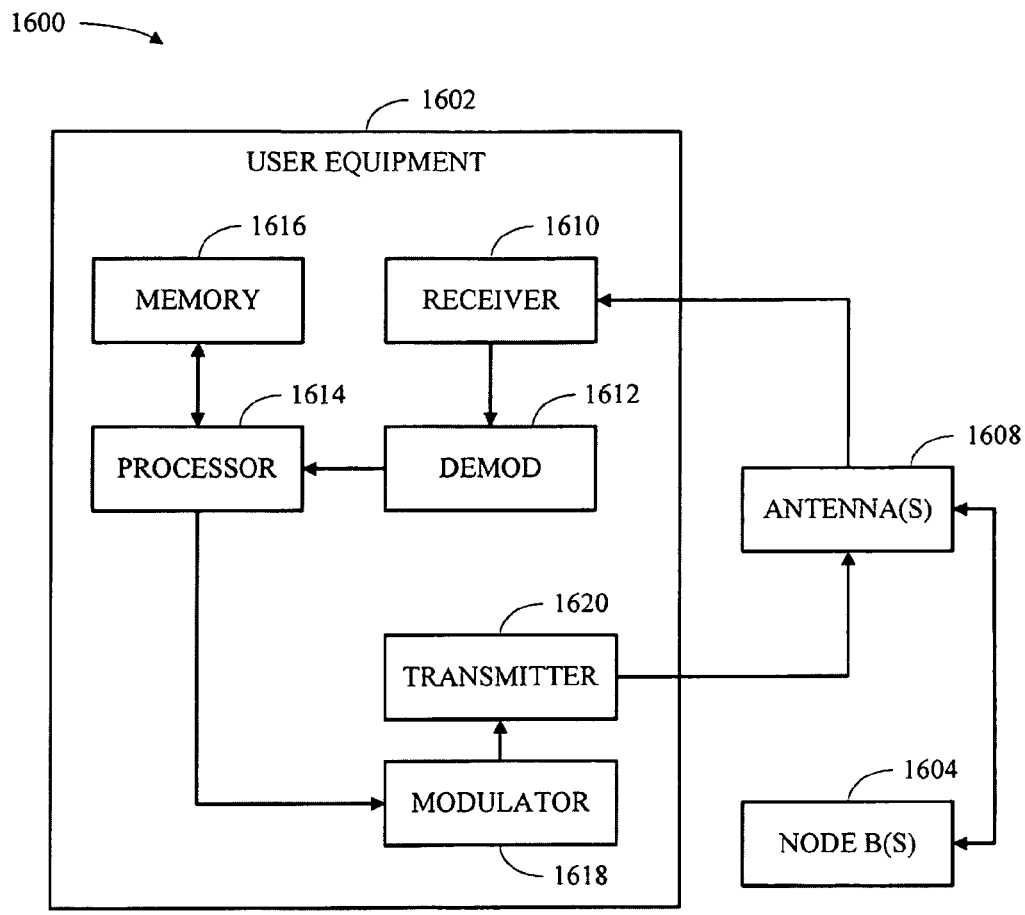

FIG. 16 is a block diagram of another system 1600 that facilitates management of a handover in a wireless communication system in accordance with various aspects described herein. In one example, system 1600 includes a terminal or user equipment (UE) 1602. As illustrated, UE 1602 can receive signal(s) from one or more Node Bs 1604 and transmit to the one or more Node Bs 1604 via one or more antennas 1608. Additionally, UE 1602 can comprise a receiver 1610 that receives information from antenna(s) 1608. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to UE 1602. Additionally, UE 1602 can employ processor 1614 to perform methodologies 1100, 1200, 1300, and/or other similar and appropriate methodologies. UE 1602 can also include a modulator 1618 that can multiplex a signal for transmission by a transmitter 1620 through antenna(s) 1608.

Figure 17:
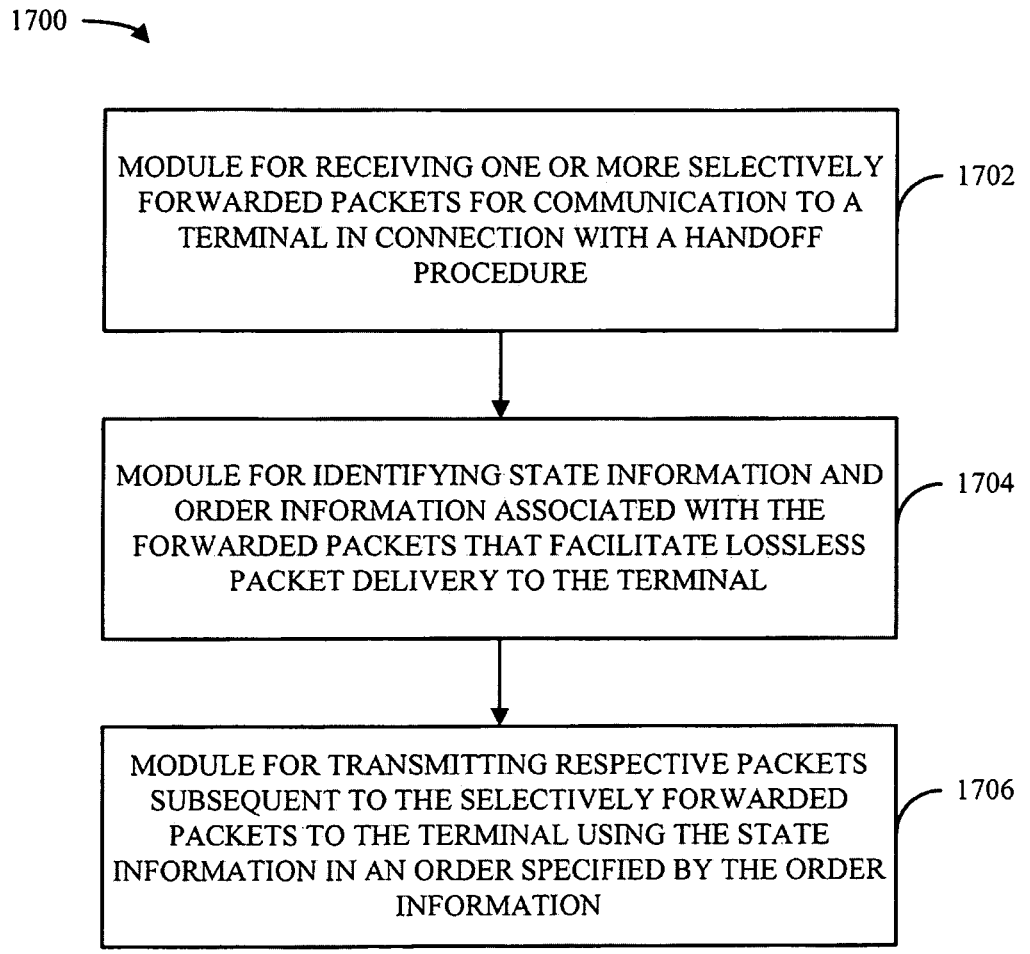
FIG. 17 is a block diagram of an apparatus that facilitates lossless and efficient sequencing and delivery of data packets.

FIG. 17 illustrates an apparatus 1700 that facilitates lossless and efficient sequencing and delivery of data packets in a wireless communication system (e.g., system 200). It is to be appreciated that apparatus 1700 is represented as including functional blocks, which can be functional blocks that represent functions implemented by a processor, software, or combination thereof (e.g., firmware). Apparatus 1700 can be implemented in an eNB (e.g., eNB 220 and/or 230) and/or any other appropriate network entity and can include a module 1702 for receiving one or more selectively forwarded packets for communication to a terminal in connection with a handoff procedure, a module 1704 for identifying state information and order information associated with the forwarded packets that facilitate lossless packet delivery to the terminal, and a module 1706 for transmitting respective packets subsequent to the selectively forwarded packets to the terminal using the state information in an order specified by the order information.

Figure 18:
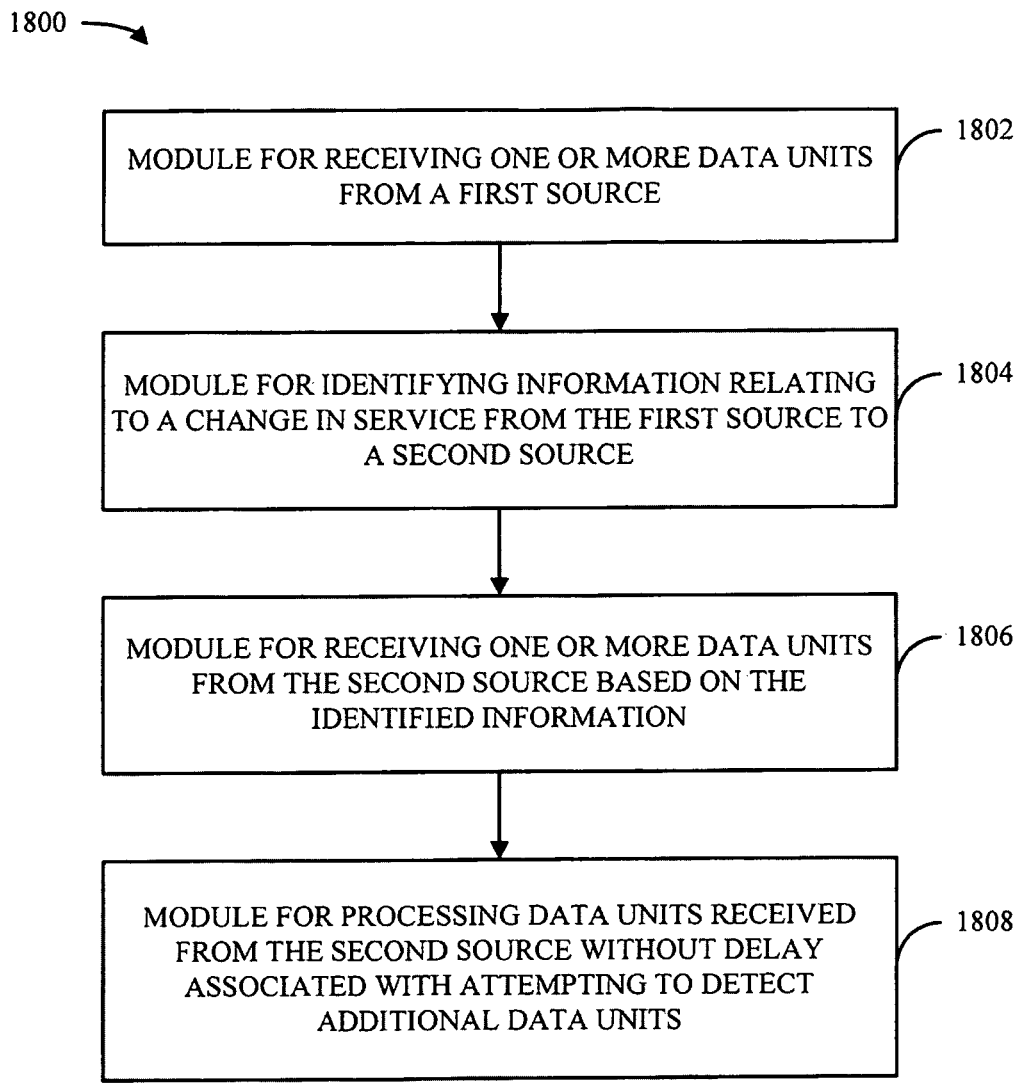
FIG. 18 is a block diagram of an apparatus that facilitates receiving and processing data units during a handoff procedure.

FIG. 18 illustrates an apparatus 1800 that facilitates receiving and processing data units during a handoff procedure. It is to be appreciated that apparatus 1800 is represented as including functional blocks, which can be functional blocks that represent functions implemented by a processor, software, or combination thereof (e.g., firmware). Apparatus 1800 can be implemented in a UE (e.g. UE 240) and/or any other appropriate network entity and can include a module 1802 for receiving one or more data units from a first source, a module 1804 for identifying information relating to a change in service from the first source to a second source, a module 1806 for receiving one or more data units from the second source based on the identified information, and a module 1808 for processing data units received from the second source without delay associated with attempting to detect additional data units.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for managing communication in a wireless communication system, comprising:
    identifying at least one forwarded packet associated with a handoff procedure;
    identifying at least one indicator including a sequence number indication, wherein the at least one indicator is received directly from a source eNodeB at a target eNodeB over an X2 interface;
    assigning a sequence number to at least one respective packet without a sequence number beginning with an initial sequence number chosen based on the received sequence number indication;
    communicating the at least one respective packet with the assigned sequence number and the at least one forwarded packet to facilitate lossless reception of the at least one respective packet.

2. The method of claim 1, wherein the sequence number indication is a last used sequence number.

3. The method of claim 1, wherein the sequence number indication is a next available sequence number.

4. The method of claim 1, wherein the communicating comprises communicating at least one Packet Data Convergence Protocol (PDCP) Service Data Unit (SDU).

5. The method of claim 1, wherein the at least one forwarded packet is different from the at least one respective packet.

6. A method for managing communication in a wireless communication system, comprising:
    identifying at least one forwarded packet associated with a handoff procedure;
    identifying at least one indicator including a sequence number, wherein the at least one indicator is received from a source eNodeB over an X2 interface;
    assigning the sequence number to at least one respective packet without a sequence number; and
    communicating the at least one respective packet with the assigned sequence number and the at least one forwarded packet to facilitate lossless reception of the at least one respective packet.

7. A method for managing communication in a wireless communication system, comprising:
    identifying at least one forwarded packet associated with a handoff procedure;
    identifying at least one indicator, the at least one indicator including sequence number information forwarded directly from a source eNodeB to a target eNodeB; and
    communicating at least one respective packet subsequent to the at least one forwarded packet based on the at least one identified indicator to facilitate lossless reception of the at least one respective packet, wherein the identifying the at least one indicator comprises receiving a sequence number from a serving gateway (SGW) over a network interface, the sequence number to be utilized for communication of an initial packet.

8. A method for managing communication in a wireless communication system, comprising:
    identifying at least one forwarded packet associated with a handoff procedure;
    identifying at least one indicator, the at least one indicator including sequence number information forwarded directly from a source eNodeB to a target eNodeB over an X2 interface; and
    communicating at least one respective packet subsequent to the at least one forwarded packet based on the at least one identified indicator to facilitate lossless reception of the at least one respective packet,
    wherein the identifying the at least one indicator comprises configuring a jump value to be applied to the at least one respective packet, and the communicating comprises:
        assigning a sequence number to the at least one respective packet beginning with a last-known sequence number of the at least one forwarded packet plus the configured jump value; and
        communicating the at least one respective packet with the assigned sequence number.

9. The method of claim 8, wherein the communicating further comprises communicating the configured jump value.

10. The method of claim 8, wherein the communicating further comprises communicating an indication that the configured jump value has been applied to the at least one respective packet.

11. The method of claim 8, wherein the communicating further comprises:
identifying a final forwarded packet associated with the handoff procedure; and
communicating an indication that communication of the at least one forwarded packet has ended following communication of the final forwarded packet to allow delivery of at least one respective subsequent packet up to an indicated sequence number notwithstanding discontinuity between a sequence number of the final forwarded packet and a sequence number of a first subsequent packet.

12. A method for managing communication in a wireless communication system, comprising:
identifying at least one forwarded packet associated with a handoff procedure;
identifying at least one indicator, the at least one indicator including sequence number information forwarded directly from a source eNodeB to a target eNodeB; and
communicating at least one respective packet subsequent to the at least one forwarded packet based on the at least one identified indicator to facilitate lossless reception of the at least one respective packet, wherein the identifying the at least one indicator comprises receiving a reset command communicated in connection with the handoff procedure, and
the communicating comprises:
assigning at least one sequence number to the at least one respective packet beginning with a predetermined reset value;
communicating an indication of the reset command; and
communicating the at least one respective packet with the assigned at least one sequence number.

13. The method of claim 12, wherein the communicating further comprises relaying the reset command.

14. The method of claim 12, wherein the communicating the indication of the reset command comprises communicating a handover command to facilitate implicit identification of the reset command based on a utilized radio bearer.

15. A method for managing communication in a wireless communication system, comprising:
identifying at least one forwarded packet associated with a handoff procedure;
identifying at least one indicator, the at least one indicator including sequence number information forwarded directly from a source eNodeB to a target eNodeB; and
communicating at least one respective packet subsequent to the at least one forwarded packet based on the at least one identified indicator to facilitate lossless reception of the at least one respective packet, wherein at least one respective non-forwarded packet is communicated over an S1 interface.

16. A wireless communications apparatus, comprising:
a memory that stores data relating to:
at least one data unit to be transmitted upon a handover of communication service to the wireless communications apparatus; and
at least one indicator that facilitates lossless delivery of the at least one data unit through the handover of communication service, the at least one indicator including sequence number information directly received from a source eNodeB at a target eNodeB over an X2 interface; and
a processor configured to assign a sequence number to the at least one data unit, which is without a sequence number, beginning with an initial sequence number chosen based on the received sequence number information and to deliver the at least one data unit with the assigned sequence number.

17. The wireless communications apparatus of claim 16, wherein the memory further stores data relating to the initial sequence number and the processor is further configured to deliver respective data units subsequent to the at least one data unit using respective successive sequence numbers subsequent to the initial sequence number.

18. The wireless communications apparatus of claim 17, wherein the processor is further configured to identify a sequence number last used for communication of a data unit and to store a sequence number following a sequence number, included in the sequence number information, as the initial sequence number.

19. The wireless communications apparatus of claim 17, wherein the processor is configured to identify a next available sequence number for communication of a next data unit and to store the next available sequence number as the initial sequence number.

20. The wireless communications apparatus of claim 16, wherein the processor is further configured to deliver respective data units using Packet Data Convergence Protocol (PDCP).

21. A wireless communications apparatus, comprising:
a memory that stores data relating to:
data relating to an initial sequence number;
at least one data unit to be transmitted upon a handover of communication service to the wireless communications apparatus; and
at least one indicator that facilitates lossless delivery of the at least one data unit through the handover of communication service, the at least one indicator including sequence number information directly received from a source eNodeB at a target eNodeB; and
a processor configured to:
determine the initial sequence number based on the received sequence number information;
assign a data unit using the initial sequence number, wherein the initial sequence number is assigned to the data unit without a sequence number;
deliver the data unit with the assigned sequence number; and
deliver respective subsequent data units using respective successive sequence numbers.

22. A wireless communications apparatus, comprising:
a memory that stores data relating to:
data relating to an initial sequence number;
at least one data unit to be transmitted upon a handover of communication service to the wireless communications apparatus; and
at least one indicator that facilitates lossless delivery of the at least one data unit through the handover of communication service, the at least one indicator including sequence number information directly forwarded from a source eNodeB to a target eNodeB; and
a processor configured to deliver:
the at least one data unit based on the at least one indicator
an initial data unit using the initial sequence number; and respective subsequent data units using respective successive sequence numbers, wherein the processor is further configured to receive the sequence number information from a serving gateway (SGW) over an S1 interface and to determine the initial sequence number based on the received sequence number information.

23. A wireless communications apparatus, comprising:
a memory that stores data relating to:
at least one data unit to be transmitted upon a handover of communication service to the wireless communications apparatus;
at least one indicator that facilitates lossless delivery of the at least one data unit through the handover of communication service, the at least one indicator including sequence number information directly forwarded from a source eNodeB to a target eNodeB over an X2 interface; and
a processor configured to deliver the at least one data unit based on the at least one indicator,
wherein:
the memory further stores data relating to a step value to be applied to an initial data unit; and
the processor is further configured:
to add the step value to a last-known sequence number to obtain an initial sequence number,
to assign the initial sequence number to an initial data unit, and
to deliver the initial data unit using the initial sequence number.

24. The wireless communications apparatus of claim 23, wherein the processor is further configured to communicate the step value.

25. The wireless communications apparatus of claim 23, wherein the processor is further configured to provide an indication that the step value has been applied to a communicated data unit.

26. A wireless communications apparatus, comprising:
a memory that stores data relating to:
at least one data unit to be transmitted upon a handover of communication service to the wireless communications apparatus; and
at least one indicator that facilitates lossless delivery of the at least one data unit through the handover of communication service, the at least one indicator including sequence number information directly forwarded from a source eNodeB to a target eNodeB; and
a processor configured to deliver the at least one data unit based on the at least one indicator, wherein:
the memory further stores data relating to a reset command and a predetermined sequence number associated with the reset command; and
the processor is further configured:
to deliver an initial data unit in a sequence of data units using the predetermined sequence number associated with the reset command; and
to deliver respective subsequent data units in the sequence using respective successive sequence numbers.

27. The wireless communications apparatus of claim 26, wherein the processor is further configured to relay the reset command.

28. An apparatus that facilitates sequencing of packets for transmission through a handoff, the apparatus comprising:
means for receiving at least one selectively forwarded packet for communication in connection with a handoff;
means for identifying state information and order information associated with the at least one selectively forwarded packet that facilitate lossless delivery of the packets, at least a portion of the order information including sequence number information received directly from a source eNodeB at a target eNodeB over an X2 interface;
means for assigning sequence numbers to respective packets without sequence numbers beginning with an initial sequence number chosen based on the sequence number indication; and
means for transmitting the respective packets with the assigned sequence numbers and the at least one selectively forwarded packet.

29. A computer program product, comprising a non-transitory computer-readable medium comprising:
code for identifying at least one Packet Data Convergence Protocol (PDCP) packet to be communicated;
code for identifying information relating to the at least one PDCP packet, the information comprising at least one of a last known sequence number used for communication, a next available sequence number for communication, a sequence step size to be applied to the at least one PDCP packet, or a reset command, in which at least a portion of the information including sequence number information is received directly from a source eNodeB at a target eNodeB over an X2 interface;
code for assigning respective sequence numbers of at least one PDCP packet without a sequence number received subsequent to the identified PDCP packets based at least in part on the identified information to facilitate continuity of sequence between at least one PDCP packet previously communicated and the at least one subsequently received PDCP packet; and
code for relaying the at least one subsequently received PDCP packet using the respectively assigned sequence numbers.

30. An integrated circuit that executes computer-executable instructions, the instructions coordinating data delivery through a handover operation, the instructions comprising:
receiving at least one selectively forwarded Service Data Unit (SDU);
identifying at least one of sequence number information or a reset command, at least a portion of the sequence number information or the reset command being received directly from a source eNodeB at a target eNodeB over an X2 interface;
receiving at least one subsequent SDU; and
associating, by assigning, sequence numbers with each of the subsequent SDUs without sequence numbers to facilitate lossless delivery of the at least one subsequent SDU and to maintain continuity between at least one SDU previously communicated and the at least one subsequent SDU based on at least one of an identified sequence number information or an identified reset command.

31. A method for processing packets received during a handoff operation, comprising:
receiving at least one packet from a first eNodeB;
identifying information associated with a handoff from the first eNodeB to a second eNodeB; and
receiving at least one packet at the second eNodeB from the first eNodeB based on the identified information, at least a portion of the identified information including a sequence number directly received from the first eNodeB at the second eNodeB over an X2 interface; and assigning a sequence number to at least one respective packet without a sequence number beginning with an initial sequence number chosen based on the identified information.

32. The method of claim 31, wherein respective received packets comprise Packet Data Convergence Protocol (PDCP) Service Data Units (SDUs).

33. A method for processing packets received during a handoff operation, comprising:
receiving at least one packet from a first eNodeB;
identifying information associated with a handoff from the first eNodeB to a second eNodeB; and
receiving at least one packet at the second eNodeB from the first eNodeB based on the identified information, at least a portion of the identified information including a sequence number directly forwarded from the first eNodeB to the second eNodeB over an X2 interface,
wherein:
the receiving the at least one packet from the first eNodeB comprises identifying a sequence number associated with a final packet received from the first eNodeB;
the identifying the information comprises identifying a step value for sequence numbers utilized in connection with the handoff from the first eNodeB to the second eNodeB; and
the receiving the at least one packet at the second eNodeB comprises receiving the at least one packet at the second eNodeB having a sequence number associated with the at least one packet based on the identified step value and processing the at least one packet without requiring a delay for detecting additional packets.

34. The method of claim 33, wherein the identifying comprises receiving the step value at the second eNodeB during the handoff.

35. The method of claim 33, wherein the identifying comprises receiving an indication of a step in sequence numbers for respective packets at the second eNodeB during the handoff.

36. A method for processing packets received during a handoff operation, comprising:
receiving at least one packet from a first eNodeB;
identifying information associated with a handoff from the first eNodeB to a second eNodeB; and
receiving at least one packet at the second eNodeB from the first eNodeB based on the identified information, at least a portion of the identified information including a sequence number directly forwarded from the first eNodeB to the second eNodeB, wherein:
the receiving the at least one packet from the first eNodeB comprises identifying a sequence number associated with a final packet received from the first eNodeB;
the identifying the information comprises identifying a step value for sequence numbers utilized in connection with the handoff from the first eNodeB to the second eNodeB; and
the receiving the at least one packet at the second eNodeB comprises receiving the at least one packet at the second eNodeB having a sequence number associated with the at least one packet based on the identified step value and processing the at least one packet without requiring a delay for detecting additional packets, and wherein the step value is known prior to the handoff from the first eNodeB to the second eNodeB.

37. A method for processing packets received during a handoff operation, comprising:
receiving at least one packet from a first eNodeB;
identifying information associated with a handoff from the first eNodeB to a second eNodeB; and
receiving at least one packet at the second eNodeB from the first eNodeB based on the identified information, at least a portion of the identified information including a sequence number directly forwarded from the first eNodeB to the second eNodeB, wherein:
the identifying comprises receiving a reset indication; and
the receiving the at least one packet at the second eNodeB comprises receiving the at least one packet at the second eNodeB having a sequence number equal to a predetermined reset sequence number and processing the at least one packet without requiring a delay for detecting additional packets.

38. The method of claim 37, wherein the reset indication is received from the first eNodeB.

39. The method of claim 37, wherein the reset indication is received at the second eNodeB.

40. A method for processing packets received during a handoff operation, comprising:
receiving at least one packet from a first eNodeB;
identifying information associated with a handoff from the first eNodeB to a second eNodeB; and
receiving at least one packet at the second eNodeB from the first eNodeB based on the identified information, at least a portion of the identified information including a sequence number directly forwarded from the first eNodeB to the second eNodeB, wherein the identifying comprises:
receiving a handover indication; and
identifying an implicitly provided reset indication based on the handover indication and at least one radio bearer associated with the handoff.

41. A wireless communications apparatus, comprising:
a memory that stores data relating to respective data units received from a first base station, respective sequence numbers associated with the data units received directly from the first base station over an X2 interface, and information relating to a handover from the first base station to a second base station; and
a processor configured to receive at least one data unit at the second base station based on the information relating to the handover without requiring a delay for attempting to detect additional data units, wherein the at least data unit is without a sequence number prior to being assigned a sequence number at the second base station based in the information relating to the handover.

42. A wireless communications apparatus, comprising:
a memory that stores data relating to respective data units received from a first base station, respective sequence numbers associated with the data units received directly from the first base station over an X2 interface, and information relating to a handover from the first base station to a second base station; and
a processor configured to receive at least one data unit at the second base station based on the information relating to the handover without requiring a delay for attempting to detect additional data units,
wherein the information relating to the handover stored by the memory comprises data relating to a jump in respective sequence numbers associated with data units received at the second base station.

43. The wireless communications apparatus of claim 42, wherein the processor is further configured to obtain the data relating to the jump in sequence numbers at the second base station.

44. The wireless communications apparatus of claim 42, wherein the processor is further configured to receive signaling at the second base station indicating that communication of the at least one data unit from the first base station has completed and to process subsequently received data units without requiring a delay for attempting to detect additional data units notwithstanding discontinuity in sequence numbers until a data unit having a predetermined sequence number is received.

45. A wireless communications apparatus, comprising:
a memory that stores data relating to respective data units received from a first base station, respective sequence numbers associated with the data units received directly from the first base station, and information relating to a handover from the first base station to a second base station; and
a processor configured to receive at least one data unit at the second base station based on the information relating to the handover without requiring a delay for attempting to detect additional data units, wherein the memory further stores data relating to a reset command and the processor is further configured to attempt to detect a predetermined data unit at the second base station having a sequence number equal to a predetermined reset value and to process the predetermined data unit upon detection without requiring a delay for attempting to detect additional data units.

46. The wireless communications apparatus of claim 45, wherein the processor is further configured to receive the reset command from the first base station.

47. The wireless communications apparatus of claim 45, wherein the processor is further configured to identify an implicit reset command based on a handover command communicated by the first base station and at least one radio bearer utilized by the wireless communications apparatus.

48. An apparatus that facilitates substantially uninterrupted data communication and processing during a communication handover, the apparatus comprising:
means for receiving at least one data unit from a first base station;
means for identifying information relating to a change in service from the first base station to a second base station;
means for receiving the at least one data unit from the first base station based on the identified information, at least a portion of the identified information including sequence number information received directly from the first base station at the second base station over an X2 interface; and
means for processing data units received at the second base station without delay associated with attempting to detect additional data units, the means for processing data units being configured to assign sequence numbers to the at least one data unit without sequence numbers beginning with an initial sequence number chosen based on the sequence number information.

49. A computer program product, comprising:
a non-transitory computer-readable medium comprising:
code for identifying at least one packet obtained from a source base station;
code for identifying at least one indicator that facilitates maintenance of a sequence between the at least one packet obtained from the source base station and at least one packet obtained from a target base station, the at least one indicator including sequence number information directly received from the source base station at the target base station over an X2 interface;
code for assigning a sequence number to the at least one packet from the target base station without a sequence number beginning with an initial sequence number chosen based on the received sequence number information; and
code for transmitting the at least one packet from the target base station with the assigned sequence number.

50. An apparatus for managing communication in a wireless communication system, comprising:
a memory that stores data relating to at least one forwarded packet associated with a handoff procedure received from a first base station, and
at least one processor coupled to the memory and configured:
to identify at least one indicator including a sequence number, wherein the at least one indicator is received at the target eNodeB directly from a source eNodeB over an X2 interface;
to assign a sequence number to at least one respective packet without a sequence number beginning with an initial sequence number chosen based on the received sequence number indication; and
to communicate the at least one respective packet with the assigned sequence number and the at least one forwarded packet to facilitate lossless reception of the at least one respective packet.

51. An apparatus for managing communication in a wireless communication system, comprising:
means for identifying at least one forwarded packet associated with a handoff procedure;
means for identifying at least one indicator including a sequence number indication, wherein the at least one indicator is received at the target eNodeB directly from a source eNodeB over an X2 interface;
means for assigning a sequence number to at least one respective packet without a sequence number beginning with an initial sequence number chosen based on the received sequence number indication; and
means for communicating the at least one respective packet with the assigned sequence number and the at least one forwarded packet to facilitate lossless reception of the at least one respective packet.

52. A computer program product, comprising:
a non-transitory computer-readable medium comprising:
code to identify at least one forwarded packet associated with a handoff procedure;
code to identify at least one indicator including a sequence number indication, wherein the at least one indicator is forwarded directly from a source eNodeB to a target eNodeB over an X2 interface;
code to assign a sequence number to at least one respective packet without a sequence number beginning with an initial sequence number chosen based on the received sequence number indication; and
code to communicate the at least one respective packet with the assigned sequence number and the at least one forwarded packet to facilitate lossless reception of the at least one respective packet.

53. An apparatus for managing communication in a wireless communication system, comprising:
a memory that stores data relating to at least one forwarded packet associated with a handoff procedure received from a first base station, and
at least one processor coupled to the memory and configured:

to identify at least one indicator, the at least one indicator including sequence number information forwarded directly from a source eNodeB to a target eNodeB; and to communicate at least one respective packet subsequent to the at least one forwarded packet based on the at least one identified indicator to facilitate lossless reception of the at least one respective packet, wherein the identifying the at least one indicator comprises receiving a sequence number from a serving gateway (SGW) over a network interface, the sequence number to be utilized for communication of an initial packet.

54. An apparatus for managing communication in a wireless communication system, comprising:

means for identifying at least one forwarded packet associated with a handoff procedure;

means for identifying at least one indicator, the at least one indicator including sequence number information forwarded directly from a source eNodeB to a target eNodeB; and means for communicating at least one respective packet subsequent to the at least one forwarded packet based on the at least one identified indicator to facilitate lossless reception of the at least one respective packet, wherein the identifying the at least one indicator comprises means for receiving a sequence number from a serving gateway (SGW) over a network interface, the sequence number to be utilized for communication of an initial packet.

55. A computer program product, comprising:

a non-transitory computer-readable medium comprising:

code to identify at least one forwarded packet associated with a handoff procedure;

code to identify at least one indicator, the at least one indicator including sequence number information forwarded directly from a source eNodeB to a target eNodeB; and code to communicate at least one respective packet subsequent to the at least one forwarded packet based on the at least one identified indicator to facilitate lossless reception of the at least one respective packet, wherein the identifying the at least one indicator comprises code for receiving a sequence number from a serving gateway (SGW) over a network interface, the sequence number to be utilized for communication of an initial packet.

56. An apparatus for managing communication in a wireless communication system, comprising:

a memory that stores data relating to at least one forwarded packet associated with a handoff procedure received from a first base station, and at least one processor coupled to the memory and configured:

to identify at least one indicator, the at least one indicator including sequence number information forwarded directly from a source eNodeB to a target eNodeB; and to communicate at least one respective packet subsequent to the at least one forwarded packet based on the at least one identified indicator to facilitate lossless reception of the at least one respective packet, wherein the identifying the at least one indicator comprises receiving a reset command communicated in connection with the handoff procedure, and the communicating comprises:

assigning at least one sequence number to the at least one respective packet beginning with a predetermined reset value;

communicating an indication of the reset command; and communicating the at least one respective packet with the assigned at least one sequence number.

57. An apparatus for managing communication in a wireless communication system, comprising:

means for identifying at least one forwarded packet associated with a handoff procedure;

means for identifying at least one indicator, the at least one indicator including sequence number information forwarded directly from a source eNodeB to a target eNodeB; and means for communicating at least one respective packet subsequent to the at least one forwarded packet based on the at least one identified indicator to facilitate lossless reception of the at least one respective packet, wherein the means for identifying the at least one indicator comprises means for receiving a reset command communicated in connection with the handoff procedure, and the means for communicating comprises:

means for assigning at least one sequence number to the at least one respective packet beginning with a predetermined reset value;

means for communicating an indication of the reset command; and means for communicating the at least one respective packet with the assigned at least one sequence number.

58. A computer program product, comprising:

a non-transitory computer-readable medium comprising:

code to identify at least one forwarded packet associated with a handoff procedure;

code to identify at least one indicator, the at least one indicator including sequence number information forwarded directly from a source eNodeB to a target eNodeB; and code to communicate at least one respective packet subsequent to the at least one forwarded packet based on the at least one identified indicator to facilitate lossless reception of the at least one respective packet, wherein the code for identifying the at least one indicator comprises code for receiving a reset command communicated in connection with the handoff procedure, and the code to communicate comprises:

code to assign at least one sequence number to the at least one respective packet beginning with a predetermined reset value;

code to communicate an indication of the reset command; and code to communicate the at least one respective packet with the assigned at least one sequence number.

59. An apparatus for managing communication in a wireless communication system, comprising:

a memory that stores data relating to at least one forwarded packet associated with a handoff procedure, and respective data units received from a first base station, at least one processor coupled to the memory and configured:

to identify at least one indicator, the at least one indicator including sequence number information forwarded directly from a source eNodeB to a target eNodeB; and to communicate at least one respective packet subsequent to the at least one forwarded packet based on the at least one identified indicator to facilitate lossless reception of the at least one respective packet, wherein at least one respective non-forwarded packet is communicated over an S1 interface.

60. An apparatus for managing communication in a wireless communication system, comprising:
 means for identifying at least one forwarded packet associated with a handoff procedure;
 means for identifying at least one indicator, the at least one indicator including sequence number information forwarded directly from a source eNodeB to a target eNodeB; and
 means for communicating at least one respective packet subsequent to the at least one forwarded packet based on the at least one identified indicator to facilitate lossless reception of the at least one respective packet, wherein at least one respective non-forwarded packet is communicated over an S1 interface.

61. A computer program product, comprising:
 a non-transitory computer-readable medium comprising:
  code to identify at least one forwarded packet associated with a handoff procedure;
  code to identify at least one indicator, the at least one indicator including sequence number information forwarded directly from a source eNodeB to a target eNodeB; and
  code to communicate at least one respective packet subsequent to the at least one forwarded packet based on the at least one identified indicator to facilitate lossless reception of the at least one respective packet, wherein at least one respective non-forwarded packet is communicated over an S1 interface.

62. A method for managing communication in a wireless communication system, comprising:
 storing data relating to an initial sequence number;
 storing at least one data unit to be transmitted upon a handover of communication service to the wireless communications apparatus;
 storing at least one indicator that facilitates lossless delivery of the at least one data unit through the handover of communication service, the at least one indicator including sequence number information directly received from a source eNodeB at a target eNodeB;
 determining the initial sequence number based on the received sequence number information;
 assigning sequence numbers to the at least one data unit without sequence numbers beginning with the initial sequence number;
 delivering a data unit of the at least one data unit using the initial sequence number; and
 delivering respective subsequent data using respective successive sequence numbers.

63. An apparatus for managing communication in a wireless communication system, comprising:
 means for storing data relating to an initial sequence number;
 means for storing at least one data unit to be transmitted upon a handover of communication service to the wireless communications apparatus;
 means for storing at least one indicator that facilitates lossless delivery of the at least one data unit through the handover of communication service, the at least one indicator including sequence number information directly received from a source eNodeB at a target eNodeB;
 means for determining the initial sequence number based on the received sequence number information;
 means for assigning sequence numbers to the at least one data unit without sequence numbers beginning with the initial sequence number;
 means for delivering a data unit of the at least one data unit with the assigned initial sequence number; and
 means for delivering respective subsequent data units with respective successive sequence numbers.

64. A computer program product, comprising:
 a non-transitory computer-readable medium comprising:
  code to store data relating to an initial sequence number;
  code to store at least one data unit to be transmitted upon a handover of communication service to the wireless communications apparatus;
  code to store at least one indicator that facilitates lossless delivery of the at least one data unit through the handover of communication service, the at least one indicator including sequence number information directly received from a source eNodeB at a target eNodeB;
  code to determine the initial sequence number based on the received sequence number information;
  code to assign sequence numbers to the at least one data unit without sequence numbers beginning with the initial sequence number;
  code to deliver a data unit of the at least one data unit with the assigned initial sequence number; and
  code to deliver respective subsequent data units with respective successive sequence numbers.

65. A method for managing communication in a wireless communication system, comprising:
 storing data relating to data relating to an initial sequence number;
 storing at least one data unit to be transmitted upon a handover of communication service to the wireless communications apparatus;
 storing at least one indicator that facilitates lossless delivery of the at least one data unit through the handover of communication service, the at least one indicator including sequence number information directly forwarded from a source eNodeB to a target eNodeB;
 delivering the at least one data unit based on the at least one indicator;
 delivering an initial data unit with the initial sequence number; and
 delivering respective subsequent data units with respective successive sequence numbers;
 receiving the sequence number information from a serving gateway (SGW) over an S 1 interface; and
 determining the initial sequence number based on the received sequence number information.

66. An apparatus for managing communication in a wireless communication system, comprising:
 means for storing data relating to data relating to an initial sequence number;
 means for storing at least one data unit to be transmitted upon a handover of communication service to the wireless communications apparatus;
 means for storing at least one indicator that facilitates lossless delivery of the at least one data unit through the handover of communication service, the at least one indicator including sequence number information directly forwarded from a source eNodeB to a target eNodeB;
 means for delivering the at least one data unit based on the at least one indicator;
 means for delivering an initial data unit with the initial sequence number;

means for delivering respective subsequent data units with respective successive sequence numbers;
means for receiving the sequence number information from a serving gateway (SGW) over an S1 interface; and
means for determining the initial sequence number based on the received sequence number information.

67. A computer program product, comprising:
a non-transitory computer-readable medium comprising:
code to store data relating to data relating to an initial sequence number;
code to store at least one data unit to be transmitted upon a handover of communication service to the wireless communications apparatus;
code to store at least one indicator that facilitates lossless delivery of the at least one data unit through the handover of communication service, the at least one indicator including sequence number information directly forwarded from a source eNodeB to a target eNodeB;
code to deliver the at least one data unit based on the at least one indicator;
code to deliver an initial data unit with the initial sequence number;
code to deliver respective subsequent data units with respective successive sequence numbers;
code to receive the sequence number information from a serving gateway (SGW) over an S1 interface; and
code to determine the initial sequence number based on the received sequence number information.

68. A method for managing communication in a wireless communication system, comprising:
storing data relating to at least one data unit to be transmitted upon a handover of communication service to the wireless communications apparatus;
storing data relating to at least one indicator that facilitates lossless delivery of the at least one data unit through the handover of communication service, the at least one indicator including sequence number information directly forwarded from a source eNodeB to a target eNodeB;
storing data relating to a reset command and a predetermined sequence number associated with the reset command;
delivering the at least one data unit based on the at least one indicator;
delivering an initial data unit in a sequence of data units using the predetermined sequence number associated with the reset command; and
delivering respective subsequent data units in the sequence using respective successive sequence numbers.

69. An apparatus for managing communication in a wireless communication system, comprising:
means for storing data relating to at least one data unit to be transmitted upon a handover of communication service to the wireless communications apparatus;
means for storing data relating to at least one indicator that facilitates lossless delivery of the at least one data unit through the handover of communication service, the at least one indicator including sequence number information directly forwarded from a source eNodeB to a target eNodeB;
means for storing data relating to a reset command and a predetermined sequence number associated with the reset command;
means for delivering the at least one data unit based on the at least one indicator;
means for delivering an initial data unit in a sequence of data units using the predetermined sequence number associated with the reset command; and
means for delivering respective subsequent data units in the sequence using respective successive sequence numbers.

70. A computer program product, comprising:
a non-transitory computer-readable medium comprising:
code to store data relating to at least one data unit to be transmitted upon a handover of communication service to the wireless communications apparatus;
code to store data relating to at least one indicator that facilitates lossless delivery of the at least one data unit through the handover of communication service, the at least one indicator including sequence number information directly forwarded from a source eNodeB to a target eNodeB;
code to store data relating to a reset command and a predetermined sequence number associated with the reset command;
code to deliver the at least one data unit based on the at least one indicator;
code to deliver an initial data unit in a sequence of data units using the predetermined sequence number associated with the reset command; and
code to deliver respective subsequent data units in the sequence using respective successive sequence numbers.

71. An apparatus for processing packets received during a handoff operation, comprising:
a memory that stores data relating to at least one received packet from a first eNodeB, and
at least one processor coupled to the memory and configured:
to identify information associated with a handoff from the first eNodeB to a second eNodeB;
to receive at least one packet at the second eNodeB from the first eNodeB based on the identified information, at least a portion of the identified information including a sequence number directly forwarded from the first eNodeB to the second eNodeB;
to identify a sequence number associated with a final packet received from the first eNodeB;
to identify a step value for sequence numbers utilized in connection with the handoff from the first eNodeB to the second eNodeB;
to receive the at least one packet at the second eNodeB having a sequence number associated with the at least one packet based on the identified step value; and
to process the at least one packet without requiring a delay for detecting additional packets, wherein the step value is known prior to the handoff from the first eNodeB to the second eNodeB.

72. An apparatus for processing packets received during a handoff operation, comprising:
means for storing data relating to at least one received packet from a first eNodeB, and
means for identifying information associated with a handoff from the first eNodeB to a second eNodeB;
means for receiving at least one packet at the second eNodeB from the first eNodeB based on the identified information, at least a portion of the identified information including a sequence number directly forwarded from the first eNodeB to the second eNodeB,
means for identifying a sequence number associated with a final packet received from the first eNodeB;

means for identifying a step value for sequence numbers utilized in connection with the handoff from the first eNodeB to the second eNodeB;
means for receiving the at least one packet at the second eNodeB having a sequence number associated with the at least one packet based on the identified step value; and
means for processing the at least one packet without requiring a delay for detecting additional packets, wherein the step value is known prior to the handoff from the first eNodeB to the second eNodeB.

73. A computer program product, comprising:
a non-transitory computer-readable medium comprising:
code to store data relating to at least one received packet from a first eNodeB,
code to identify information associated with a handoff from the first eNodeB to a second eNodeB;
code to receive at least one packet at the second eNodeB from the first eNodeB based on the identified information, at least a portion of the identified information including a sequence number directly forwarded from the first eNodeB to the second eNodeB,
code to identify a sequence number associated with a final packet received from the first eNodeB;
code to identify a step value for sequence numbers utilized in connection with the handoff from the first eNodeB to the second eNodeB;
code to receive the at least one packet at the second eNodeB having a sequence number associated with the at least one packet based on the identified step value; and
code to process the at least one packet without requiring a delay for detecting additional packets, wherein the step value is known prior to the handoff from the first eNodeB to the second eNodeB.

74. An apparatus for processing packets received during a handoff operation, comprising:
a memory that stores data relating to at least one received packet from a first eNodeB, and
at least one processor coupled to the memory and configured:
to identify information associated with a handoff from the first eNodeB to a second eNodeB;
to receive at least one packet at the second eNodeB from the first eNodeB based on the identified information, at least a portion of the identified information including a sequence number directly forwarded from the first eNodeB to the second eNodeB,
to receive a reset indication;
to receive the at least one packet at the second eNodeB having a sequence number equal to a predetermined reset sequence number; and
to process the at least one packet without requiring a delay for detecting additional packets.

75. An apparatus for processing packets received during a handoff operation, comprising:
means for receiving at least one packet from a first eNodeB;
means for identifying information associated with a handoff from the first eNodeB to a second eNodeB;
means for receiving at least one packet at the second eNodeB from the first eNodeB based on the identified information, at least a portion of the identified information including a sequence number directly forwarded from the first eNodeB to the second eNodeB;
means for receiving a reset indication;
means for receiving the at least one packet at the second eNodeB having a sequence number equal to a predetermined reset sequence number; and
means for processing the at least one packet without requiring a delay for detecting additional packets.

76. A computer program product, comprising:
a non-transitory computer-readable medium comprising:
code to receive at least one packet from a first eNodeB;
code to identify information associated with a handoff from the first eNodeB to a second eNodeB;
code to receive at least one packet at the second eNodeB from the first eNodeB based on the identified information, at least a portion of the identified information including a sequence number directly forwarded from the first eNodeB to the second eNodeB;
code to receive a reset indication;
code to receive the at least one packet at the second eNodeB having a sequence number equal to a predetermined reset sequence number; and
code to process the at least one packet without requiring a delay for detecting additional packets.

77. An apparatus for processing packets received during a handoff operation, comprising:
a memory that stores data relating to at least one received packet from a first eNodeB, and
at least one processor coupled to the memory and configured:
to identify information associated with a handoff from the first eNodeB to a second eNodeB;
to receive at least one packet at the second eNodeB from the first eNodeB based on the identified information, at least a portion of the identified information including a sequence number directly forwarded from the first eNodeB to the second eNodeB,
to receive a handover indication; and
to identify an implicitly provided reset indication based on the handover indication and at least one radio bearer associated with the handoff.

78. An apparatus for processing packets received during a handoff operation, comprising:
means for receiving at least one packet from a first eNodeB;
means for identifying information associated with a handoff from the first eNodeB to a second eNodeB; and
means for receiving at least one packet at the second eNodeB from the first eNodeB based on the identified information, at least a portion of the identified information including a sequence number directly forwarded from the first eNodeB to the second eNodeB,
means for receiving a handover indication; and
means for identifying an implicitly provided reset indication based on the handover indication and at least one radio bearer associated with the handoff.

79. A computer program product, comprising:
a non-transitory computer-readable medium comprising:
code to receive at least one packet from a first eNodeB;
code to identify information associated with a handoff from the first eNodeB to a second eNodeB; and
code to receive at least one packet at the second eNodeB from the first eNodeB based on the identified information, at least a portion of the identified information including a sequence number directly forwarded from the first eNodeB to the second eNodeB,
code to receive a handover indication; and
code to identify an implicitly provided reset indication based on the handover indication and at least one radio bearer associated with the handoff.

80. A method for managing communication in a wireless communication system, comprising:
- storing data relating to respective data units received from a first base station;
- storing data relating to respective sequence numbers associated with the data units received directly from the first base station;
- storing data relating to information relating to a handover from the first base station to a second base station;
- storing data relating to a reset command;
- receiving at least one data unit at the second base station based on the information relating to the handover without requiring a delay for attempting to detect additional data units;
- attempting to detect a predetermined data unit at the second base station having a sequence number equal to a predetermined reset value; and
- processing the predetermined data unit upon detection without requiring a delay for attempting to detect additional data units.

81. An apparatus for managing communication in a wireless communication system, comprising:
- means for storing data relating to respective data units received from a first base station;
- means for storing data relating to respective sequence numbers associated with the data units received directly from the first base station;
- means for storing data relating to information relating to a handover from the first base station to a second base station;
- means for storing data relating to a reset command;
- means for receiving at least one data unit at the second base station based on the information relating to the handover without requiring a delay for attempting to detect additional data units;
- means for attempting to detect a predetermined data unit at the second base station having a sequence number equal to a predetermined reset value; and
- means for processing the predetermined data unit upon detection without requiring a delay for attempting to detect additional data units.

82. A computer program product, comprising:
a non-transitory computer-readable medium comprising:
- code to store data relating to respective data units received from a first base station;
- code to store data relating to respective sequence numbers associated with the data units received directly from the first base station;
- code to store data relating to information relating to a handover from the first base station to a second base station;
- code to store data relating to a reset command;
- code to receive at least one data unit at the second base station based on the information relating to the handover without requiring a delay for attempting to detect additional data units;
- code to attempt to detect a predetermined data unit at the second base station having a sequence number equal to a predetermined reset value; and
- code to process the predetermined data unit upon detection without requiring a delay for attempting to detect additional data units.

\* \* \* \* \*